United States Patent [19]

Van Laere

[11] Patent Number: 4,822,958

[45] Date of Patent: Apr. 18, 1989

[54] ELECTRIC ROTARY POWER TOOL APPARATUS HOLDABLE BY HAND DURING OPERATION, KIT COMPRISING THE SAME; AND NOVEL SWITCH MEANS THEREFOR

[76] Inventor: Christiaan G. M. Van Laere, Rigistrasse 4, CH-8802 Kilchberg, Switzerland

[21] Appl. No.: 879,458

[22] Filed: Jun. 27, 1986

Related U.S. Application Data

[63] Continuation-in-part of Ser. No. 594,797, Mar. 29, 1984, Pat. No. 4,619,162, which is a continuation-in-part of Ser. No. 430,763, Sep. 30, 1982, Pat. No. 4,505,170.

[51] Int. Cl.⁴ .................... H01H 9/00; H01H 21/00; H02K 11/00

[52] U.S. Cl. .................... 200/1 V; 200/567; 310/68 A

[58] Field of Search .................... 200/1 V, 51 R, 155 R, 200/157; 310/66, 68 A; 74/421 A; 81/464

[56] References Cited

U.S. PATENT DOCUMENTS

| | | | |
|---|---|---|---|
| 2,293,015 | 8/1942 | Cohen | 200/155 A |
| 3,434,366 | 3/1969 | Raso | 74/421 R |
| 3,681,550 | 8/1972 | Perry | 200/155 R |
| 3,755,640 | 8/1973 | Kaman et al. | 200/157 |
| 3,821,902 | 7/1974 | Du Bois et al. | 74/16 |
| 4,314,170 | 2/1982 | Sahrbacker | 310/68 R |
| 4,368,784 | 1/1983 | Wünsch et al. | 173/12 |
| 4,505,170 | 3/1985 | Van Laere | 81/464 |
| 4,558,189 | 12/1985 | Dibbern, Jr. et al. | 200/1 V |
| 4,619,162 | 10/1986 | Van Laere | 81/464 |

FOREIGN PATENT DOCUMENTS

| | | |
|---|---|---|
| 3007630 | 3/1981 | Fed. Rep. of Germany . |
| 3015423 | 10/1981 | Fed. Rep. of Germany . |
| 553625 | 9/1974 | Switzerland . |

*Primary Examiner*—J. R. Scott

*Attorney, Agent, or Firm*—Gilbert L. Wells; Heinrich W. Herzfeld

[57] ABSTRACT

A switch for controlling electric D.C., especially for a power tool held by hand during operation, for heavy duty work, preferably from an automobile battery, of 8 to 40 volts and sufficient amperage for at least about 180 watt-input into the idling tool motor, comprises a base mountable on the motor rearwall, fixed contactors on the base, a supporting member bearing shiftable contactor elements, a first engaging member on the base, another engaging member on the supporting member and pivotably engaged by the first engaging member, a resilient organ urging the two engaging members into engagement, and preferably enhancing contact pressure between the fixed and shiftable contactors when a manual actuator has pivoted the supporting member from neutral into an activating position. A restoring spring can return the supporting member automatically to neutral.

12 Claims, 13 Drawing Sheets

FIG. 14
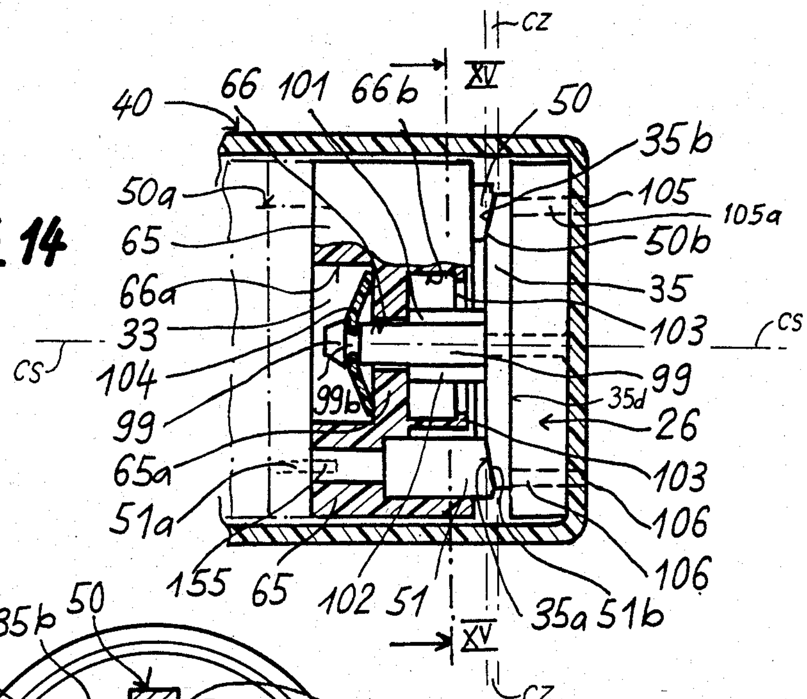
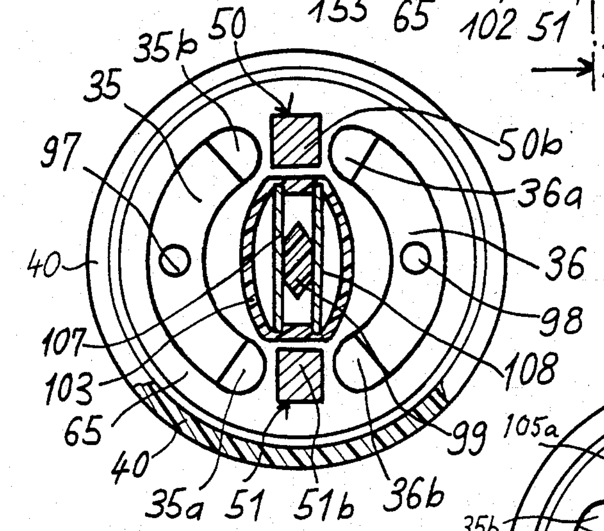
FIG. 15
FIG. 16
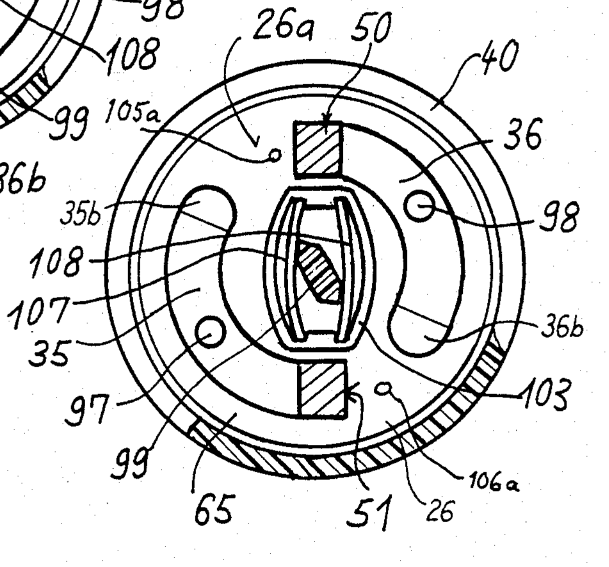

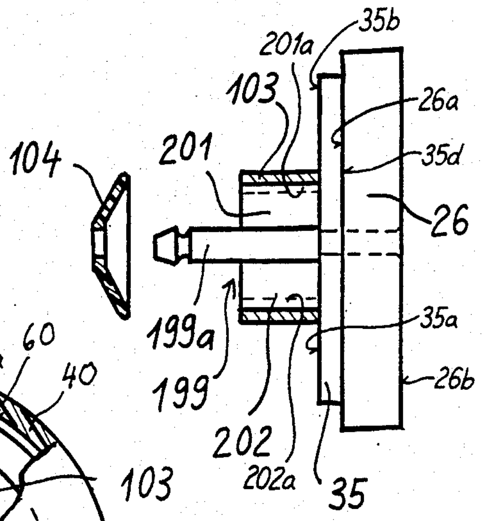
FIG.17
FIG. 18
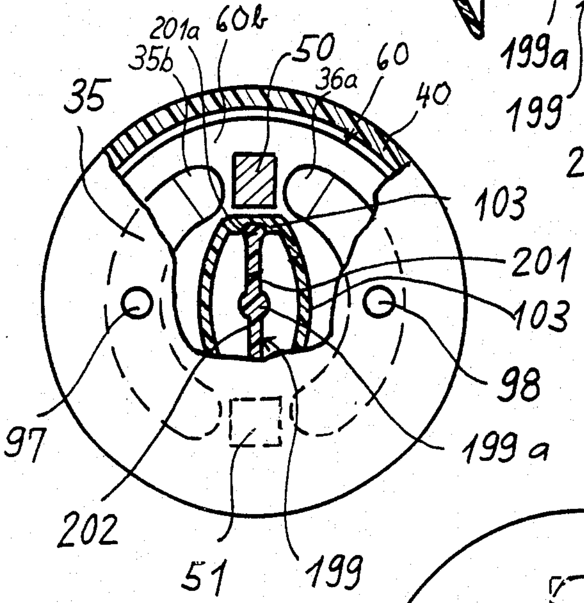
FIG. 19
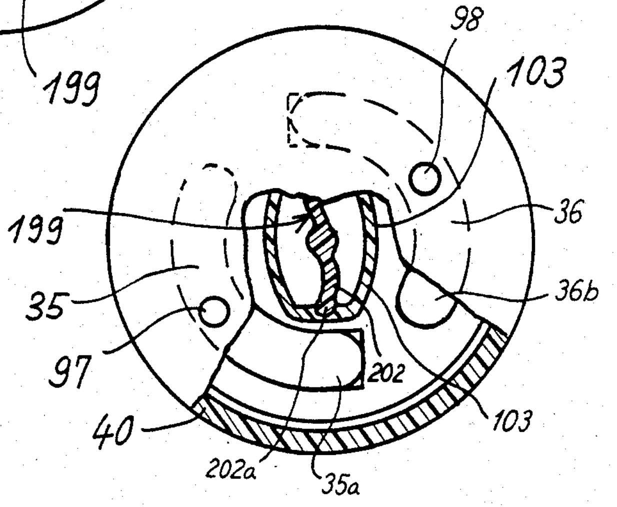

ELECTRIC ROTARY POWER TOOL APPARATUS HOLDABLE BY HAND DURING OPERATION, KIT COMPRISING THE SAME; AND NOVEL SWITCH MEANS THEREFOR

CROSS REFERENCE TO RELATED APPLICATIONS

This application is a continuation-in-part of my earlier pending patent application Ser. No. 06/594,797 filed Mar. 29, 1984, now U.S. Pat. No. 4,619,162 granted Oct. 28, 1986, which is in turn a continuation-in-part of my patent application Ser. No. 06/430,763 filed Sept. 30, 1982, now U.S. Pat. No. 4,505,170 granted on Mar. 19, 1985.

BACKGROUND OF THE INVENTION

This invention relates to novel switch means for electric power tool apparatus holdable by hand during operation.

Power tool apparatus in which the switch means according to the invention can be integrated with special advantage, have been described in my U.S. Pat. Nos. 4,505,170 and 4,619,162; such apparatus consists essentially of (A) a first building block comprising (1) an apparatus casing consisting essentially of an elongated assembly having a longitudinal axis and comprising (1.1) an enveloping shell extending generally in the direction of the said longitudinal axis, and having an open front end and an open rear end; and being of one piece;

(1.2) a first transverse wall extending across the interior of the shell in a region thereof intermediate the said front end and the said rear end axially spaced from both these ends so as to divide the shell interior into a forward chamber and a rearward chamber; the first transverse wall has a throughhole therein and is integral with the said shell;

(1.3) a second transverse wall across the open rear end of the shell and being detachably mounted therein; the second transverse wall has an opening therein; and (1.4) a speed-reducing unit which is mounted on the second transverse wall on the side thereof facing toward the first transverse wall, and comprises a driven power-transmitting shaft having a driven shaft front end and adapted for fitting into the said throughhole and protruding therefrom into the forward chamber of the shell;

(B) a second, rearward building block comprising (2) an electric direct current motor comprising, in turn, (2.1) a motor housing having a central longitudinal axis substantially parallel with the elongated assembly axis, and comprising a surrounding hull, a forward hull end, a rearward hull end wall, and being adapted for having the front end thereof rigidly connected with the second transverse wall on the outside of the latter;

(2.2) driving motor shaft means extending through the interior of the motor housing and being rotatably supported in the opening of the second transverse wall; the driving rotor shaft means have a forward shaft end extend into the rearward shell chamber and are adapted for drivingly engaging the said speed-reducing unit therein; and (3) insertable bearing-wall means adapted for being mounted transversely in rigid, detachable connection, in the said open front end of the enveloping shell, and having a central axial throughhole; these insertable bearing-wall means comprise (3.1) shaft-bearing means in the axial throughhole in which a driven power-transmitting shaft of the power tool apparatus can be supported.

An apparatus of the type described hereinbefore has been disclosed by V. Raso and A. C. Eisenhart in their U.S. Pat. No. 3,434,366 granted Mar. 25, 1969.

However, this known apparatus is not intended to be held by hand, especially during operation, but is to be mounted stationary on a solid base 5 on supporting feet 156 (FIG. 1 of U.S. Pat. No. 3,434,366).

If it were adapted to be used by hand it could be used for short tools such as sockets for tightening and loosening nuts or for screwdrivers. However, no heavy duty work could be done with such a power tool, when of reduced size to render it holdable by hand, as the apparatus lacks power-enhancing means such as an impact clutch or the like and could not support the same inside the forward housing of the frame or enveloping sleeve which is only intended to house a gear reduction unit distributed over both the forward and the rearward chamber which are formed in the frame of the Raso et al reduction unit.

A known electrical switch adapted to be mounted on the end part of an electric direct current motor next adjacent the commutator thereof has been described in U.S. Pat. No. 3,681,550 issued on Aug. 1st, 1972 to Perry and Brockelsby. In this known electrical switch, contactor pins 66 extend from a rearward outer plate 62 corresponding to a cap member end wall, infra, in a switch structure through an intermediary cap member 54 into a pivotable brush mounting plate 40 in which there are housed four brushes 47 which are urged with their contractable forward end faces against an insulating wafer 26 having four openings 32 to 35 therein. As the brushes come to register with these openings owing to rotation of the brush mounting plate relative to the wafer, the brushes will penetrate through the openings and come into contact with a conically-shaped surface composed of commutator segments. Flexible wire connections are provided within the brush mounting plate and connect the brushes with the ends of the connector pins lodged in the brush mounting plate.

This known switch is thus of rater complicated structure and suffers from a considerable number of points where the various elements are subject to relatively rapid wear.

In the prior power-tool apparatus known to me, an exchange of impact means or the like present in a forward chamber of the apparatus casing is only provided for by making the forward part of the apparatus casing detachable from the rearward part thereof housing the speed-reducing unit. After the forward apparatus part has been detached, the impact clutch or the like power-transmitting means housed therein can be withdrawn from the forward chamber only by way of the rearward end of the forward part, or, depending on the structure of each casing, part or all of the speed-reducing unit must be removed, before another type of power-transmitting unit can be inserted in that forward chamber.

This is the case in the power tool apparatus described in my U.S. Pat. No. 4,505,170 dated Mar. 19, 1985; in U.S. Pat. No. 4,368,784 to Wünsch et al, granted on Jan. 18, 1983; in German, Offenlegungsschrift DE No. 30 07 630, applied for by Rodac Pneumatic Tools, Carson, Calif., and published on Mar. 12, 1981 (U.S. patent application Ser. No. 70,149 filed on Aug. 27, 1979); in German Offenlegungsschrift DE No. 30 15 423, applied for by Robert Bosch GmbH, Stuttgart, Germany, and published on Oct. 29, 1981; and in Swiss Pat. No. 553,625 granted to Atlas Copco Aktiebolaget, Nacka, Sweden and published on Sept. 13, 1974.

OBJECTS AND SUMMARY OF THE INVENTION

It is a first object of this invention to provide electric switch means for switching direct electric current, with a minimum of power loss even when switching strong direct electric currents having a potential of preferably from about 8 to about 40 volts and an amperage sufficient for affording a power input into the electric motor of at least about 180 watt, when idling, and at least 620 watt when under load.

It is a further object of the invention to provide electric switch means adapted to be mounted at the rear end of an electric direct current motor next adjacent a commutator mounted on the rotor shaft of the motor, which switch means are distinguished by a reduced number of elements of greatly simplified structure in which the number of points at which wear of parts or current losses may occur as well as the rate of wear of such parts have been reduced considerably.

It is yet another object of the invention to provide electric switch means for association with electric heavy duty power tools being held by hand during operation by a single operator, which switch means can be actuated for forward or reverse drive or stoppage by the operator without lifting a hand off the power tool.

It is moreover an object of the invention to provide switch means having the above-described advantageous properties and being adapted for controlling strong electric direct currents as defined above, required in operating heavy tool power apparatus, for instance suitable for work on such sites as scaffoldings of high buildings, and particularly nut-loosening and tightening of heavy duty nuts or bolts, e.g., of automobile and truck wheels, screw-driving tools, drilling tools, blade saws, sanders and cutters.

These objects are to be attained particularly when associating the electric switch means according to the invention with the electric direct current motors in rotary power tool apparatus described in my U.S. Pat. Nos. 4,505,190 and 4,619,162.

Preferably, the such rotary power tool apparatus equipped with the above-mentioned electric direct current motors and with the novel switch means according to the invention, operate most efficiently when the speed-reducing unit described as item (1.4) hereinbefore, comprises a gear train consisting essentially of a plurality of gears and a number of transmission shafts each bearing at least one gear, one of which gears is a pinion adapted for being mounted on the forward shaft end of the driving rotor shaft means, and one of the transmission shafts is comprised by the said driven power-transmitting shaft means; the transmission shafts are supported in the first and second transverse walls, respectively. Optimal power output is obtained when the ratio of the speed of the driving rotor shaft means to the driven power-transmitting shaft means is from about 7:1 to about 12:1.

I have found the above-mentioned transmission ratio of from about 7:1 to 12:1 to be critical, because below and above that ratio, even though the resulting speed of the driven shaft is about 1200 to 4000 r.p.m., the apparatus will fail to loosen severely jammed or seized bolts or nuts of automobile wheels in an increasing number of cases, the greater the difference from the above-stated range of ratios. The choice of the transmission ratio is dependent on the idling speed of the driven shaft of the motor; thus, when that idling speed is 30,000 r.p.m., a transmission ratio of 12:1 is preferred. If a ratio of 7:1 were used, a flywheel effect might be produced by the impact mass and an impact-generating unit would be no more effective and might even be damaged.

An electric direct current motor in the rotary power tool apparatus described in my U.S. Pat. Nos. 4,505,170 and 4,619,162 with which the switch means according to the invention are destined to be mainly associated, preferably comprises (2.3) a rotor mounted inside the motor housing on the driving rotor shaft means for rotating the latter;

(2.4) stator means adapted for generating an electric field for cooperation with said rotor; and (2.5) commutator means comprising (2.5.a) a commutator consisting essentially of collector segments and being mounted on the driving rotor shaft means between the rotor and the said rearward motor housing end wall;

(2.5.b) first and second brush means mounted in the motor housing and biased toward the collector segments for electrically conductive contact therewith to deliver, preferably direct, electric current to the rotor;

(2.5.c) first and second fixed contactor means being electrically conductively connected with the first and second brush means, respectively, and being mounted stationary in the rearward building block and having terminal portions located outside the rearward motor housing end wall; the fixed contactor terminal portions bearing contactable surface regions located generally in a substantially planar contact zone; and (2.5.d) electrically conductive lead means adapted for connecting the first and second brush means, respectively with the first and second fixed contactor means, substantially free from electrical power losses. This last mentioned advantageous feature is achieved by providing lead means of a sufficiently large cross sectional area, and by avoiding at the junctions between the lead means and other conductive elements all soldered joints, using instead clamping-in connections ensuring metal-on-metal pressure contact.

In a preferred embodiment of the electric motor, the stator means comprise a stator mounted in the interior of the motor housing and being a permanent magnet of magnetic iron material, the permanent magnet comprising a north pole shoe and a south pole shoe of substantially semicylindrical configuration and having each a thickness of from about 5 to 6 mm, the pole shoes of the permanent magnet being concentrical with the longitudinal rotor axis; and opposite longitudinal gaps having each a circumferential width, in a radial plane, of about 9 to 33 mm and separating said two pole shoes from one another; the length of the permanent magnet being from about 30 to 65 mm; and the radial diameter of the assembled rotor and two pole shoes taken together being from about 42 to 45 mm;

and the rotor consists essentially of (i) a generally drum-shaped armature on the rotor shaft and having a substantially cylindrical surface section coaxial with the longitudinal rotor axis and with an external diameter of about 32 mm and a length of from about 26 to 55 mm, the armature having 12 axially extending cutout channels parallel with the longitudinal rotor axis and opening out of the external surface section of the armature; the internal diameter of said armature between the deepest ends of every two diametrically opposite cut-out channels being from about 16 to 17 mm, (ii) a wiring of electrically conductive wire having a diameter of each individual wire cross section of from about 0.56 to 0.72 mm and comprising a plurality of wire portions, each of the channels containing about 30 to 37 of the wire portions, and (iii) the commutator comprises 12 collector segments and is mounted on the rotor shaft; and the total length of wire amounts to from about 12 to about 24 meters.

All measures are taken to ensure a minimum of resistance losses in the paths of direct electric current between the current source and the collector segments of the motor armature. Thus, the cables used to connect the +pole and the −pole of the battery with the corresponding connecting contactor elements of the switch preferably comprise a parcel of fifty wires each being 0.25 mm thick, the parcel having a diameter of 2.5 mm, when a normal car battery is being used, while, in the case of a truck (lorry) battery the parcel has a diameter of about 3 mm and consists of fifty wires each having a thickness of 0.38 mm.

The electric motor is preferably devised to be fed an electric direct current from an automobile battery having a nominal voltage of 12 volts and an operational voltage of at least 10 volts, a power output of at least 250 watt; and the idling speed of the motor at that voltage ranges from about 10,000 to 25,000 r.p.m., the transmission ratio is 7:1 to 12:1 and the driven shaft has correspondingly an idling speed of above 1200 and up to 4000 r.p.m., and preferably a speed from about 1200 to 2200 r.p.m.

Most preferred is an idling speed of the motor of from 13,000 to 15,000 r.p.m.

It would have been expected that such high speed which means less strength of the motor, would be too weak and therefore fail to loosen severely jammed or seized bolts or nuts when a speed of 7000 r.p.m. would fail if the motor receives its direct current from a 12 volt-automobile battery.

When the energy is supplied to the power tool apparatus according to this first invention aspect from a 12 volt-automobile battery, then the speed of the driving motor shaft, at the nominal voltage of 12 volts, should at least be 4000 r.p.m. under full load.

The amperage of the power source (preferably a car battery of 12 or 24 volts) delivered to the tool apparatus equipped with the last-mentioned motor, under load should be at least 20 and preferably 125 up to 150 amperes, and from 180 amperes up to 300 to 400 amperes for heavy duty work.

The objects enumerated hereinbefore are attained, in accordance with the invention, by electrical direct current switch means which are adapted for interposition in an electrical current flow path between a direct current source and the commutator means of an electrical direct current motor. These electrical switch means have a central switch axis and a substantially planar contact zone extending normal to the switch axis and comprise (4) an electrical switch means being adapted for switching a direct electrical current having an electric potential of from 8 to about 40 volts and an amperage sufficient for affording a power input of the electric motor of 180 watt, when idling, and, under load, of 620 watt. These electrical switch means according to the invention comprise the substantially planar contact zone mentioned above (see 2.5.c), and are preferably housed in a rearward building block of the power tool apparatus described in my U.S. Pat. Nos. 4,505,170 and 4,619,162 and comprise more in detail (4.1) stationary mounting base means having an outer mounting face and an opposite inner mounting face;

(4.2) first and second stationary contactor means mounted fixedly in position in the said inner mounting face of the base means and being radially spaced from the central switch axis extending normal to the said mounting faces.

The stationary mounting base means can be mounted on the rearward end wall of an electric direct current motor, at the end thereof adjacent the commutator of the motor, or can be integral with that rearward end wall.

The switch means according to the invention further comprise (4.3) a pivotable supporting member having at least one electrically insulating face turned toward said inner mounting face of said base means and an opposite outer face, each insulating face being spaced from and registering with a corresponding one of the contactable surface region of the fixed contactor means. The pivotable supporting member has a peripheral rim thereabout extending radially spaced about said central switch axis. Preferably, the pivotable supporting member has substantially the same diameter as the base member, and the insulating face thereof is preferably near or in the planar contact zone. The contactable surface regions of the terminal fixed contactor portions are preferably arranged symmetrically about the central switch axis.

The novel switch means further comprise (4.4) socket throughholes extending through said pivotable supporting member and each having orifices, respectively, in said opposite outer face thereof and in a correspondingly electrically insulating face thereof, the socket throughholes being adapted for receiving each a prong of an electric plug insertable therein from the opposite outer face of the pivotable supporting member, said plug being connectable to lead means from a source of electric direct current;

(4.5) at least two shiftable elongated and rigid contactor elements having each a contact-making section facing toward said base member, an opposite external face, and a joining portion, taken in a zone perpendicular to the central switch axis, the joining portion being affixed to the pivotable supporting member in fixed engagement therewith and insulatingly spaced from one another, and each located in such relation to a socket throughhole that electrical contact is made between the respective contactor elements and a prong being inserted in that throughhole; and each of the contact making sections protrudes from a corresponding one of the electrically insulating faces of said pivotable supporting member; electrical contact between each of the contactor elements and a respective prong, on the one hand, and between each contact-making section of a contactor element and the respective surface region, of a stationary contact means, being contacted by the shiftable contactor element when the pivotable supporting member is in an activating position, being made substantially loss-free;

(4.6) engaging means for pivotably mounting the pivotable supporting member on the stationary mounting base means, comprising a first engaging member mounted fixedly on said inner mounting face of said base member so as to project therefrom toward said pivotable supporting member, and a second engaging member mounted fixedly on the pivotable supporting member for pivoting motion in unison therewith, and projecting therefrom toward the mounting base means, one of the first and second engaging members having a male projection adapted for penetrating engagingly into an adjacent corresponding female portion of the other engaging members; and further comprising means for exerting forces on the first and second engaging members for urging them into engagement with one another along the central switch axis;

(4.7) manual actuating means for tangentially acting on the peripheral rim of the pivotable supporting member for pivoting the same to at least one of the three positions of (a) an "off" position in which the shiftable contact elements are in circuit-breaking position with regard to the fixed contactor means, (b) a first "on" position in which a first shiftable contact element is in circuit-making contact with a corresponding first fixed contactor means and a second shiftable contact element is in circuit-making contact with a corresponding second fixed contactor means, thereby enabling direct current flow through the switch means in a given direction, and (c) a second "on" position in which the first and second shiftable contact elements are in circuit-making contact, respectively, with the second and the first fixed contactor means, thereby enabling direct current flow through the switch means in the reverse direction. The actuating means are positively connected with the pivotable supporting member for rotation in unison therewith.

Another advantageous embodiment of an electric switch according to the invention is constituted by an on-off reversing switch comprising supporting means, spaced from and pivotally mounted on an external face of the rear end wall of the motor housing and having an inner and an outer face both extending substantially transversely to the longitudinal rotor axis;

a pair of shiftable contactor means mounted in the supporting means and extending from outside the outer face thereof through the cap member and protruding from the inner face thereof toward the rear end wall of the motor housing, the supporting means having passage means for the introduction of a pair of lead means from a plus pole and a minus pole, respectively of an automobile battery or the like into the interspace between the rear end wall and the inner face of the cap member, and into electrically conductive engagement with a first and second one, respectively, of the pair of shiftable contactor means, the shiftable contactor means being so disposed in the cap member as to be switched by corresponding turning of the cap member to adopt three different positions, in a first "off" one of which, parts of the shiftable contactor means at the inner face of the cover means are out of contact with both the first and secondary contactor means, while in a second position, a first one of the shiftable contactor means makes contact with the first stationary contactor means lodged in the rear motor housing end wall on the outside thereof, and the second shiftable contactor means makes contact with the second stationary contactor means also on the outside of the rear end wall, thereby activating the motor for rotating the driving shaft in a given direction of rotation, and, in a third position, the second one of the shiftable contactor means makes contact with the first stationary contactor means, and the first shiftable contactor means makes contact with the second stationary contactor means, thereby reversing the direction of rotation of the motor and the driving shaft.

A first one of the two regions consisting of the said lateral contact region and the said contactable sidewall region, comprises inwardly crimped contact spring parts and the other region is of pin-shaped configuration so as to be clampingly engageable the aforesaid first region.

In a particularly preferred embodiment of the switch means according to the invention, each of the shiftable contactor elements is curved, having a cross-sectional area, of arc-shaped configuration, elongated in a plane normal to the central switch axis; and wherein the contactable surface region on each of the terminal portions of the first and second fixed contactor portions constitutes the frontal face of the respective terminal portion and extends in the contact zone in a plane substantially normal to the central switch axis, thereby being adapted for circuit-making with a corresponding shiftable contactor element. The arc formed by each contactor element elongated in the said cross-sectional area plane preferably extends through a major portion of a half circle about the switch axis, and the first and second shiftable contactor elements each rest with their outer faces firmly on the pivotable supporting member over the entire lengths of the arc.

a first one of the said shiftable contactor elements being lodged in the electrically insulating face of the supporting member spaced from and curved about the central switch axis and a second one of the contactor elements is lodged in the insulating face mirror-symmetrically to the first contactor elements. The arc-shaped contactor elements can have advantageously at least one end thereof beveled to form a ramp facilitating sliding of the contact face thereon on to the respective contactable surface region of the nearest fixed contactor portion.

It is also preferable that, in the engaging means described hereinbefore in item (4.6) the said male projection is constituted by a stem protruding centrally axially from the inner mounting face, the stem having at he free end thereof an internally threaded axial cavity, and the female portion of the other engaging means is constituted by a dome part projecting centrally axially from the electrically insulating contactor element face inside the half circles thereon occupied by the shiftable contactor elements, the dome part having a central opening for the entry of the stem thereinto, and the means for exerting forces comprise an adjustable screw means having an enlarged head and a shaft part bearing an external threading for adjustably engaging the internal threading in the stem cavity; and a compressible pressure spring, being mounted about the screw shaft part, and lodged inside the dome part and against the screw head.

In a preferred embodiment of the actuating means, described hereinbefore under item (4.7) of the electrical switch means according to the invention, these actuating means are constituted by a cap member comprising a cap end wall and a hull part upstanding axially therefrom about an inner face of the cap end wall; the inner face of the cap end wall being turned toward the outer face of the pivotable supporting member; the hull extending axially at least to the plane normal to the central switch axis in which the outer face of the base means extends;

the cap member has passage means for the introduction of a pair of lead means extending from a source of electric energy into electrically conductive engagement with a pair of the shiftable contactor means.

It is furthermore preferred that the electrical switch means according to the invention comprise restoring means for returning the shiftable supporting member automatically from an activating "on" position to the neutral "off" position.

In an advantageous embodiment, the restoring means are constituted by a coil spring having two free ends one of which is in engagement with the pivotable supporting member and the other spring end is held in the stationary mounting means whereby this spring applies restoring bias into the neutral position to the pivotable supporting member when the latter is pivoted from neutral position to an activating position.

When the electric switch means according to the invention comprises as engaging means the above-mentioned stem, dome part, adjustable screw and compressible pressure spring mentioned hereinbefore the aforesaid coil spring constituting the above-mentioned restoring means can be lodged inside the dome part, surrounding the pressure spring therein, the dome part having a sidewall and a radial slot in the sidewall, and the stationary mounting means has two stops projecting radially inwardly toward the dome part, one of the free ends of the coil spring abutting against and being arrested by one of the stops when the pivotable supporting member is pivoted into an activating position while the other free coil spring end abuts against an end of the arcuate dome part sidewall slot remote from the arresting stop.

In another embodiment, the restoring means comprise a shaft member, mounted either on the pivotable supporting member or on the stationary base means, respectively. The cross-sectional area of the shaft member is of elongated configuration and has a larger diameter in a first direction and a smaller diameter in a second direction at a right angle to the said first direction, and two elastically flexible blade members in a cage mounted on the stationary base means, or on the pivotable supporting member, respectively, lie firmly and straight against opposite flanks of the shaft member spaced from each other by the said smaller diameter when the pivotable supporting member is in neutral position, while they lie with biasing torque against two other opposite flanks of the shaft member, spaced by the said larger diameter from each other, when the pivotable supporting member is in an activating position: the resulting torque biases the shaft member toward return to its neutral position.

It is particularly important for a particularly superior functioning of the novel switch that the first engagement means of the biasing means are mounted on a front face of the stationary mounting means which front face is turned toward the supporting member, and that the second engagement means are mounted on the same face of the supporting member that bears the shiftable contactor elements, and that, while one of the said first and second engagement means protrudes from the respective face bearing the same into an interspace between the front face of the stationary mounting means and the contactor elements-bearing face of the supporting member, the other engagement means protrude from the other face far enough into the said interspace to be engagement with the first mentioned engagement means so that the supporting member is pivotable relatively to the mounting means.

The substantially planar contact zone in which the frontward ends of the fixed contactor means are located, extends through the above-mentioned interspace preferably substantially parallel with the said front face of the stationary mounting means; and the contact-making regions of the shiftable contactor elements on the supporting member must be movable into the said planar contact zone; or vice versa, i.e., the substantially planar contact zone extends substantially parallel with the contactors-bearing face of the supporting member, then the contactable regions of the fixed contactor means must extend into that contact zone.

In the last described embodiment of the switch means according to the invention, the shiftable contactors can be switched by a corresponding turn of the cap member to adopt at least three different positions; in a first "off" position, parts of the shiftable contactor means at the inner face of the cap member are out of contact with both the first and the second stationary contactor means, while in a second position, a first one of the shiftable contactor means makes contact with the first stationary contactor means lodged in the stationary mounting means, and the second shiftable contactor means makes contact with the second stationary contactor means also projecting from the stationary mounting means, thereby being capable of activating a motor for rotating a driving shaft thereof in a given direction of rotation, and, in a third position, the second one of the shiftable contactor means makes contact with the first stationary contactor means, and the first shiftable contactor means makes contact with the second stationary contactor means, thereby being capable of reversing the direction of rotation of the said motor and the said driving shaft, or of a corresponding machine.

In another embodiment of the switch according to the invention, the supporting member can have a circumferential rim and can be mounted in the cap member pivotably about the central switch axis; while the cap member is connected rigidly with the rearward motor housing wall; and the supporting member can then comprise (4.1.a) a switch-shifting member protruding tangentially from said supporting member rim; and the cap member can then be provided with a window registering with the switch-shifting member through which window the switch-shifting member protrudes when the supporting member is in neutral position; depression of the protruding end of the switch-shifting member causing the supporting member to turn about the central switch axis and shift from its neutral to an activating position.

In another mode of associating the switch means according to the invention with a rotary power tool apparatus being holdable by hand during operation, there can be provided, as a supplementary part of a rearward building block of the apparatus, as described in my U.S. Pat. Nos. 4,505,170 and 4,619,162.

(6) a handle part having at least two opposite handle sidewalls and being firmly connectable with the first building block, the handle part having a central longitudinal axis, extending transverse relative to the longitudinal building block assembly axis, which is preferably the rotary axis of the electrical direct current motor therein; and the opposite handle sidewalls have upper end portions adapted for firmly supporting the cap member in a manner such that the said cap member can not be pivoted.

Only the stationary mounting base means described under (4.1) and the first and second stationary contactor means described hereinbefore in item (4.2) of a first switch means are then needed in the rearward building block on the rearward motor housing end wall therein, while a complete switch means according to the invention is built in the handle part described in item (6) and having a second central switch axis extending preferably at a right angle to the first central switch axis along which the above-mentioned switch parts according to (4.1) and (4.2) are aligned. The complete second switch means in the handle part comprise (7.1) a pair of third and fourth fixed contactor means, (7.2) second stationary mounting means adapted for holding the third and fourth fixed contactor means firmly in position therein relative to the second switch axis, and being mounted in the handle part on an inside face of one of the said opposite handle sidewalls; and the third and fourth fixed contactor means have terminal portions protruding, into an interspace between the opposite handle sidewalls from the second mounting means, and bear fixed contactable third and fourth surface regions, respectively, located generally in a second planar contact zone;

(7.3) electrically conductive cord means extending through the handle unit, having two ends, one end of which cord means is connected to the third and fourth contactor means; while, at the other end thereof, the cord means comprise plug means adapted for being inserted through the cap member into contact with the contactable regions of the first and second stationary contactor means;

(7.4) secondary throughholes in the cap member for rendering the contactable regions of the first and second contactor means accessible to contact by plug means inserted in these secondary throughholes; when the handle part is not used;

(7.5) a second pivotable supporting member having at least one electrically insulating face located spaced from, and substantially parallel with the said second planar contact zone;

(7.6) handle socket throughholes opening out of the handle unit and being adapted for receiving in each throughhole plug-connecting means associated with an electrical plug being connectable to a source of electric direct current;

(7.7) at least two shiftable handle contactor elements being mounted on the said insulating face of the second supporting member so as to be electrically insulated from each other, and close to the said handle socket throughholes so as to make substantially loss-free contact with the plug-connecting means when the electrical plug mentioned under (7.6), supra, is connected to the handle socket throughholes;

(7.8) .second biasing means mounted in the handle unit and comprising first and second engagement means mutually pivotably engaged and cooperating with each other in biasing the second supporting member toward the second stationary mounting means, while being pivotable relative to each other, together with the second supporting member and the second stationary mounting means;

and the second pivotable supporting member has a peripheral rim and comprises (7.5.a) at least one switch-shifting member tangentially protruding from the rim of the second supporting member, while the handle unit has window means through which the switch-shifting member is adapted to protrude when the second supporting member is in neutral position; whereas depression of the protruding end of the switch-shifting member will cause the supporting member to turn through a small angle about the second central switch axis and will thereby shift from its neutral to an activating position; and, lastly, the second switch comprises (7.9) second restoring means being in engagement with the second supporting member and comprising second arresting means being held in the second stationary mounting means so as to cause restoring bias to be applied to the second supporting member when the same is pivoted from its neutral position to an activated position.

BRIEF DESCRIPTION OF THE DRAWINGS

Further objects and advantages of the invention will become apparent from the following more detailed description thereof in connection with the accompanying drawings in which

FIG. 14 is an axial-sectional view of a second embodiment of the biasing means in the switch means according to the invention;

FIG. 15 is a cross-sectional view of the embodiment of switch means and biasing means taken in a plane indicated by XV—XV in FIG. 14, with the parts in neutral position;

FIG. 16 is a view similar to that of FIG. 15, with the parts in an activating position;

FIG. 17 is an exploded view of the parts constituting a third embodiment of the biasing means in the third embodiment of the switch means according to the invention;

FIG. 18 is a partly cut-away rear end view similar to that of FIG. 15, but with the third embodiment of the biasing means shown in FIG. 17 in neutral position;

FIG. 19 is a view similar to FIG. 18, but with the parts in an activating position;

DETAILED DESCRIPTION OF THE EMBODIMENTS SHOWN IN THE DRAWINGS

Figure 1:
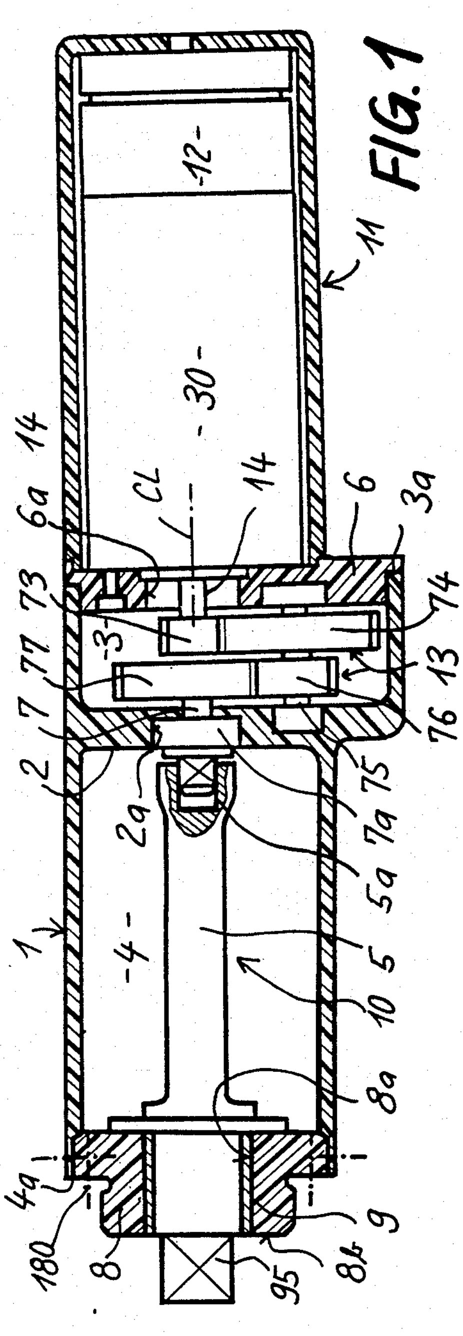
FIG. 1 is an axial sectional view of a schematical representation of a preferred embodiment of the electric rotary power tool apparatus in which the switch means according to the invention can be integrated and which are composed of three building blocks.

A first embodiment of my power tool apparatus of particularly uncomplicated structure is shown in FIG. 1. This embodiment is built from an enveloping shell 1 having a central longitudinal axis CL and containing, integral with the shell 1, a transverse wall 2. This transverse wall 2 divides the shell interior into a rearward chamber 3, having an open rear end 3a, and a forward chamber 4 having an open front end 4a of the shell 1. In the rearward shell chamber 3 there is housed a speed-reducing unit 13 which will be described more in detail below. The open shell rear end 3a is closed by a second, transverse closing wall 6, which has an opening 6a. Likewise, the first transverse wall 2 has an opening 2a therein.

Between the two transverse, upright walls 2 and 6 enclosing the rearward shell chamber 3, the speed-reducing unit 13 is mounted as described hereinafter A driving shaft 14 extends through the wall opening 6a into the rearward shell chamber 3, and bears at its end a pinion 73; and a driven shaft 7 of the speed-reducing unit 13 extends through the wall opening 2a into the forward shell chamber 4.

The shell 1 and the speed-reducing unit 13 therein constitute a first building block of the power tool apparatus according to the invention. A second building block is constituted by a motor unit 11, to be described in detail hereinafter, which unit is mounted fixedly on the outside of the second transverse, closing wall 6.

A third building block comprises an insertable bearing-wall 8 which has a central opening 8a in which there is fitted a bearing 9. This bearing 9 is preferably a bronze bearing or constituted by a sintered bushing such as a carbide bearing or the like, in which there is supported a power-transmitting unit 10 which, in the simple construction of the embodiment of FIG. 1, is constituted solely by an intermediary shaft 5, one end 7a of which is connected, for instance by a square head joint, for rotation with the driven shaft 7 near the transverse wall 2, and which extends through the forward shell chamber 3 and is supported in the bearing 9 in the bearing wall 8. From the latter the intermediary shaft 5 protrudes with its square-head front end 5a to outside the bearing-wall 8. The latter, the bearing 9 and the shaft 5 thus can be assembled to constitute the entire third building block, and can be inserted into the forward shell chamber 3 via the open front end 4a and can be guided in the bearing 9 so that the rearward end 7a is brought automatically into engagement with the forward square-head end of the driven shaft 7 which end extends out of the opening 2a into the forward shell chamber 4.

It is thus easy for an operator of the power tool apparatus according to the invention, for instance a construction worker doing heavy duty work, e.g., on a several stories-high scaffolding, who holds the enveloping shell 1 and the motor unit 11 thereon with one hand, to remove the entire inset unit comprising the bearing-wall 8, by detaching the latter from the front end 4a of the shell 1 with his other hand, depositing it in a kit box, taking out a different inset unit, which also comprises a bearing-wall 8, and reintroducing the new unit into the forward chamber 4 of the power tool apparatus via the open front end 4a of the shell 1.

Fastening means holding the bearing wall 8 in the shell front end 4a are of conventional snap-in, screw, or bolt-and-nut type and have been omitted from the figures of the drawing for the sake of clarity. Such fastening means are also used for mounting the motor unit on the transverse rear wall 6, and elsewhere in the apparatus as mentioned further below.

Figure 2:
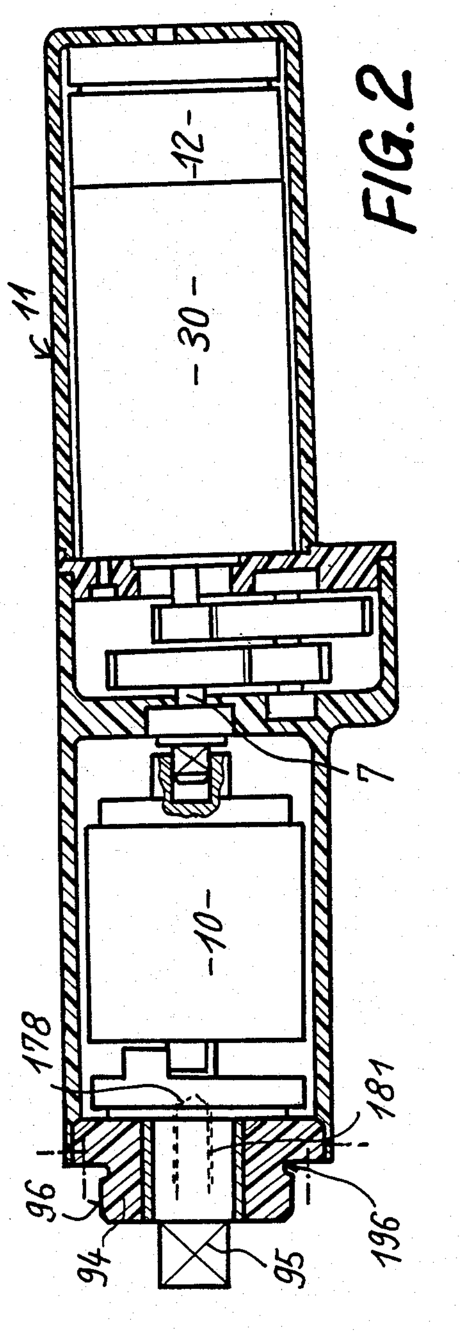
FIG. 2 is an axial sectional view of a similar embodiment, but with a different third building block, comprising a first embodiment of an impact unit.

In the embodiment shown in FIG. 2, parts identical with those of FIG. 1 bear the same reference numerals. The inset building block 10 is constituted by an impact-generating unit, described in my U.S. Pat. Nos. 4,505,170 and 4,619,162.

The following terms used in this description as well as in the appended claims such as "upper," "lower," "downward," etc. have reference to the respective positions as shown in the drawings. Moreover, the terms "front" and "forward," "rear" and "rearward" have reference to the apparatus as seen by the user holding it in hand, with the motor unit at the rearward and the inset unit at the front end.

Figure 3:
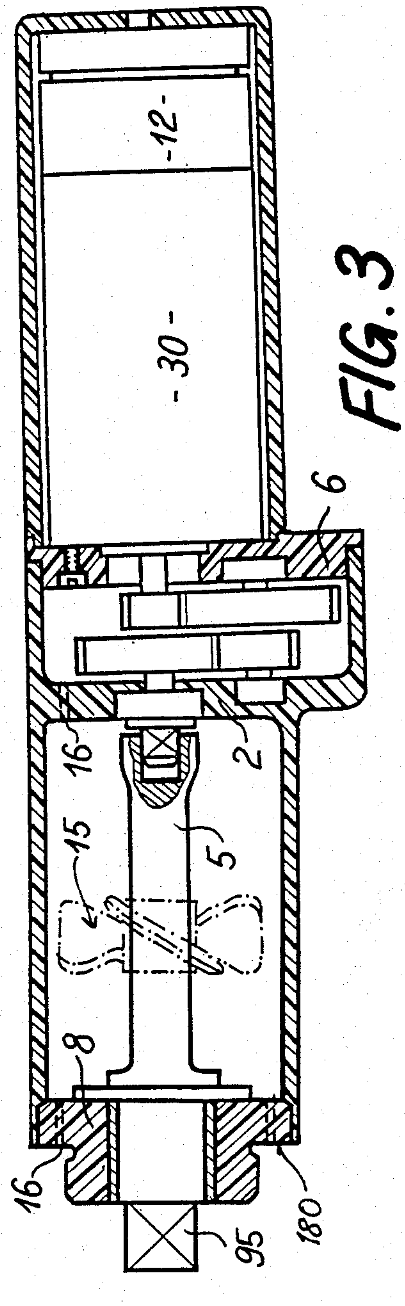
FIG. 3 is an axial sectional view of an embodiment similar to that shown in FIG. 1, but with a fan mounted on an insert shaft as part of the third building block.

In FIG. 3, there is shown, inserted in the same first building block as in FIGS. 1 and 2, a further embodiment of the third, i.e., the inset building block, which comprises the intermediate shaft 5 as well as a fan 15. During operation, this fan 15 can generate an air current through the entire interior of the enveloping shell 1; in this case air passages 16 are provided axially through the walls 2, 6 and 8 of the apparatus housing. Depending on the sense of rotation of the shaft 5, the fan 15 can blow air on to a tool attached to the square-head 95 of the driven shaft 5, or it can blow air into the motor unit 11 and cool the electrical motor therein.

The second rearward building block consists essentially of a motor unit 11 which comprises a motor and switch means 12 therefor.

The motor in the rearward building block is preferably an electric motor, and, for heavy duty work, when an automobile battery or portable nickel-cadmium battery are available, and also when the operator uses a kit according to the invention, which may contain the portable battery, an electric direct current motor has been found to be more satisfactory than any other type. The motor data given hereinafter by way of example are those of a motor which has proven to be most successful in heavy duty work as well as in all kinds of lighter work.

Figure 4:
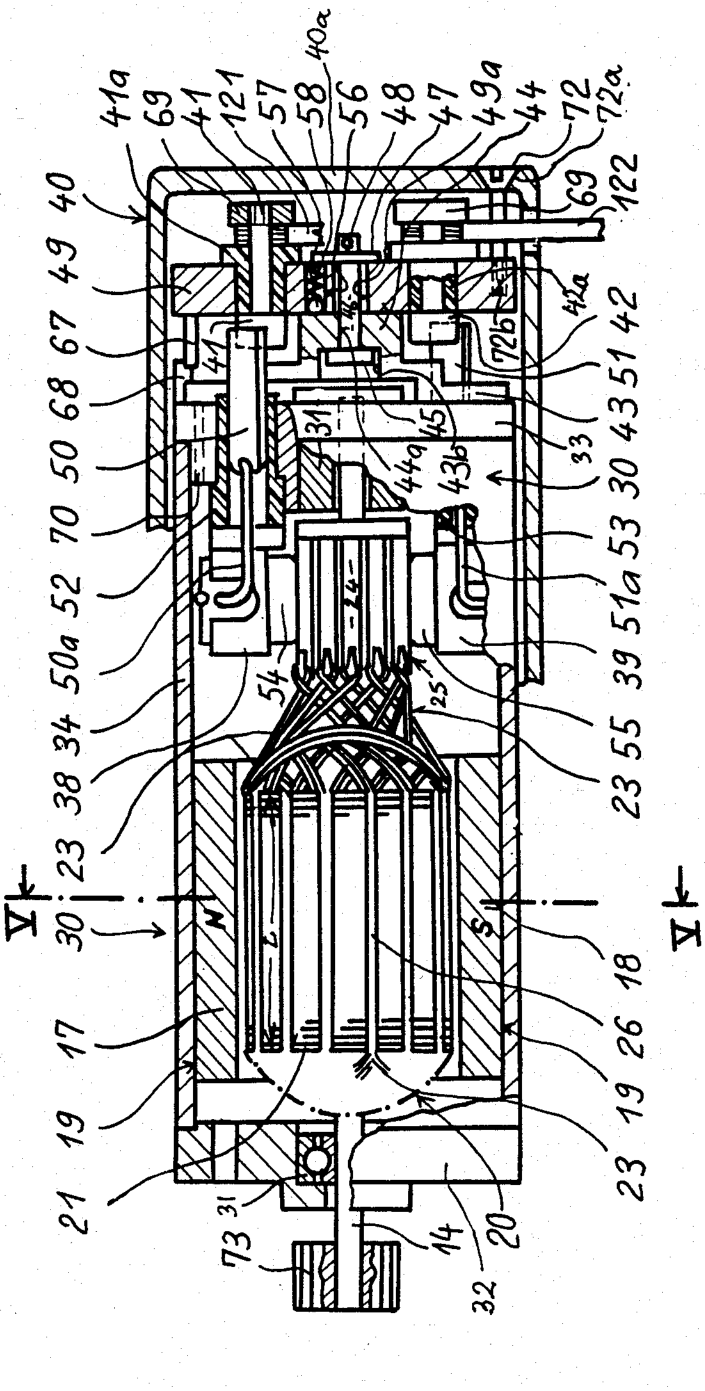
FIG. 4 illustrates, more in detail, a first embodiment of the motor unit constituting the second rearward building block, in a lateral view and partially in axial section.
Figure 5:
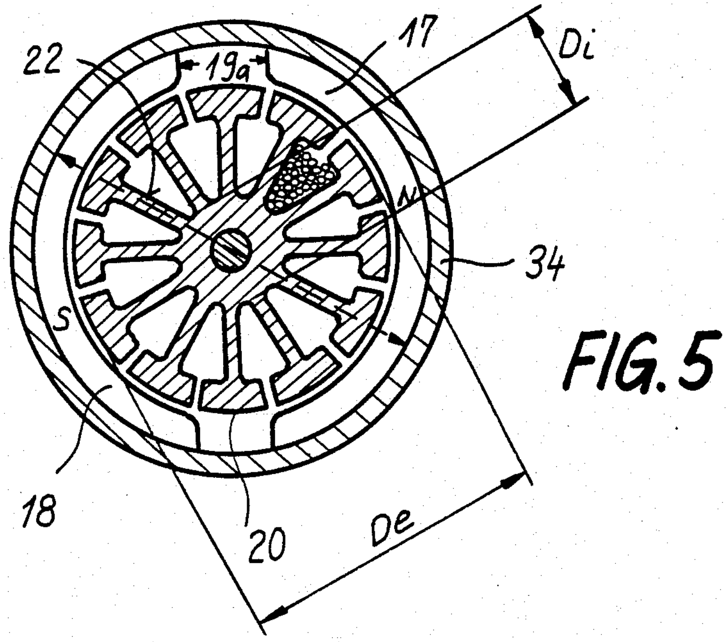
FIG. 5 is a cross sectional view of the same embodiment of the motor unit taken in a plane indicated by V—V in FIG. 4.

The motor unit 11 is shown in more detail in FIGS. 4 and 5. The unit comprises an electric D.C. motor which comprises a generally drum-shaped armature 20 composed of forty lamellae 21, each consisting of about 0.65 mm thick sheet iron plates having an external diameter $D_e$ of 32 mm, which are arranged in parallel to form a package having an overall length L of 26 mm (FIG. 4). Each lamella 21 has in its outer annular zone twelve radial lamella cutouts 22, and the internal diameter $D_i$ of the lamella between the deepest ends of two diametrically opposite cutouts 22 is 16.7 mm. The lamellae 21 in the stack thereof forming the armature 20 are superimposed upon each other so that the cutouts register with one another and form twelve axially extending channels 26 in the external surface of the armature 20. Each of these channels houses portions, shown in cross section only in a single cutout 22 for the sake of clarity, of a hard copper wire 23. This copper wire has a diameter of 0.56 mm. Windings of this copper wire are wound about the armature in loops, so that 32 wire portions fill each of the channels 26, each loop consisting of two such portions and having a length of about 60 to 70 mm, i.e., a bit more than double the length of the armature. The wire windings are formed by pieces of wire having a length of about one meter, so that each such piece of wire can be wound in about sixteen loops from the rear end of the motor about the armature 20 through the channels 26 of the latter. The two free ends of each piece of wire are soldered to different collector segments 24 of a commutator 25 which is mounted fixedly on a driving shaft 14 in common with the armature 20 for rotation in unison therewith.

As there are twelve pieces of wire having a total of 24 free wire ends, twelve collector segments 24 are provided in the commutator 25, the whole constituting a two-pole drum-winding having a total length of twelve meters of wire of about 12 meters. The total number of wire portions in the twelve channels which should be shown in FIG. 5 would be 384.

The driving shaft 14 is supported in roller or bronze bearings 31 which are mounted respectively in the frontal end wall 32 and the rear end wall 33 of a motor housing 30. The latter is in turn held firmly in the upright wall 6 of the apparatus shell 1, as shown in FIG. 1.

The housing further comprises a cylindrical hull 34 which bears in its interior firmly attached to its inside wall the north pole shoe 17 and the south pole shoe 18 of a permanent magnet 19 of magnetic iron which have a length, in axial direction, of 31 mm and a radial thickness of 5.5 mm.

The gap 19*a* between the axially extending flanks of the north pole shoe 17 and the south pole shoe 18 on either side of the armature 20 is from about 9 mm to 33 mm, when the external diameter $D_e$ of the armature is 32 mm (see FIG. 5 in which the gap 19*a* is about 15 mm when $D_e$ is 54 mm, and see also Page 67, item (5)). The general arrangement of permanent magnet and armature is well known and illustrated in FIG. 150 of chapter "Gleichstrommaschinen" in "Elektrotechnik" by A. Däschler, a text-book published in 1968 by Verlag Aargauer Tagblatt AG in Aarau, Switzerland. However, as indicated in FIG. 152 of the same publication, the armature diameter is expected to be about 600 mm instead of the 32 mm of our novel D.C. motor. While the D.C. motor, according to FIG. 152 of the Däschler-textbook affords 280 kilowatts (kW) at 1470 r.p.m., our motor affords under load 0.6 kW at about 3700 r.p.m.

Electric motors of electric power-operated impact wrenches which are presently available in the market and are capable of loosening jammed or seized nuts or threaded bolts of automobile wheels for the purpose of changing automobile tires must derive their power from an electric main, e.g., of 220 to 240 volts of A.C.

Several impact wrenches of this type have been described under the heading "Schlagschrauber" in the publication "Bosch Elektrowerkzeuge, Programm 1980/81" in August 1980, by Robert Bosch GmbH, D-7022 Leinfelden-Echterdingen, Germany.

In contrast thereto, the above-described electric direct current motor in my preferred embodiment is fed by a D.C. of 12 volts (operational voltage of about 10 to 14 volts) as supplied by a common automobile battery and operates at a speed under full load of 2000 to 2800 r.p.m., with a power input of about 300 to 450 Watt (25 to 40 amperes) and a power output of about 250 Watt, and a loosening torque up to 800 Nm (25 amperes and higher); the apparatus has a weight of maximally 3 kg, and even less. When connected to a heavy automobile battery of 24 volts, it operates under full load with a speed of 4000 r.p.m.

The fully satisfactory results obtained with the preferred embodiment of the power wrench described in my U.S. Pat. Nos. 4,505,170 and 4,619,162 are particularly unexpected as it would have been obvious that the severer the jamming or seizing of the screw to be loosened, the slower should be the motor and the less its full load speed and the higher its power input and output.

I have discovered unexpectedly that the opposite, is true and that a "weaker" motor operating at higher speed under full load can do the same job successfully even though it is fed with direct electric current of low voltage, e.g., 12 or 24 volts of an automobile battery.

The small size, low weight and high speed of the above-described motor used in the preferred impact wrench described in my aforesaid two U.S. patents is comparable only to those of compressed air motors as they are known to be used in Atlas Copco wrenches (see the publication "Schrauber" by Atlas Copco Aktiebolag, Nacka, Sweden, in November 1971). However, these wrenches are destined only for screws having a diameter of about 5 to 8 mm, and are therefore unsuitable for tightening or loosening screws or bolts of automobile wheels. The same is true for the Mitsubishi hobby impact tool apparatus, in particular drills, driven by small motors as described hereinbefore.

In attaining the objects of the power tool apparatus described in my U.S. Pat. Nos. 4,505,170 and 4,619,162, I have found the following features described hereinafter to be also critical, i.e., the high speed of the weaker motor is only one of several criteria I had to observe in achieving the above-stated main object.

Thus, I have found that the speed reduction ratio of the driving to the driven shaft in the speed reducing unit is highly critical in order to achieve the object of loosening severely jammed or seized screws, bolts or nuts of the type used for mounting automobile wheels on their hubs. This speed reduction ratio should be in the range of from abut 12:1 to about 7:1, the ratio of 7:1 being the preferred one when the apparatus is operated with D.C. drawn from a 12 volt-automobile battery.

In order to obtain a particularly satisfactory operation of the embodiment of the power tool apparatus shown in FIGS. 1 to 8, described in my U.S. Pat. Nos. 4,505,170 and 4,619,162, it has also been found very advantageous to avoid voltage and resistance losses by providing novel on-off and reversing switch means 12 according to the invention.

Figure 6:
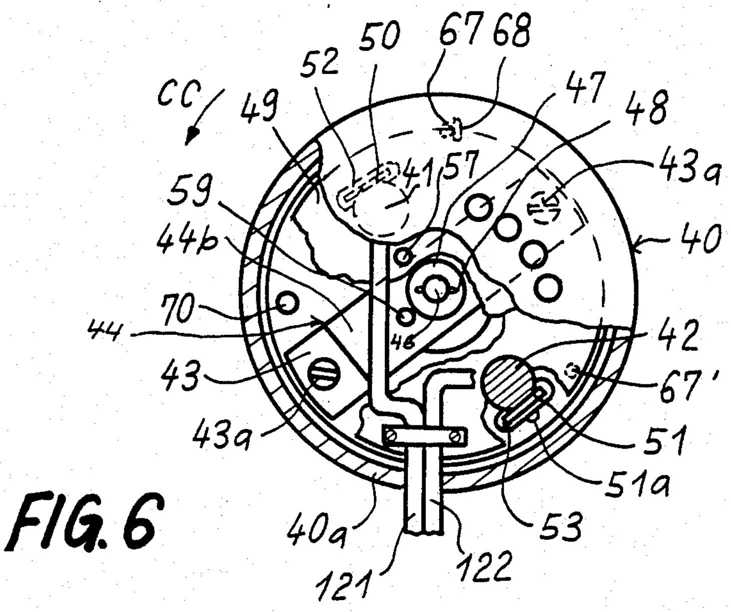
FIG. 6 is a partially cross sectional rear view of the rearward end of the motor unit embodiment shown in FIG. 4, comprising a first embodiment of switch means which has been described in my U.S. Pat. No. 4,505,170.

A first embodiment of such switch means 12 described in my U.S. Pat. No. 4,505,170 is illustrated in FIGS. 4 and 6. The leads 121 and 122 from the +pole and the −pole, respectively, of a 12 Volt- or 24 Volt-automobile battery are connected to two contactor pins 41 and 42 which are mounted inside a rotatable switch cap 40 on a pins-supporting disc 49, being electrically insulated against the latter by insulating jacket 41*a* and 42*a*. The disc 49 is firmly connected with the switch cap 40, for rotation therewith, by means of one or several connecting flat-head screw bolts 72 inserted through a hole 72*a* in the cap bottom wall 40*a* and screwed into a threaded bore 72*b* in the supporting disc 49. The disc 49 is rotatably mounted on a bridge member 43 which is fastened by means of screws 43*a* on the outside face of the rear end wall 33 of the motor housing 30. The bridge member 43 has on its side facing away from the rear end wall 33 an outwardly projecting raised central bridge portion 44 and a central bore 44*a* therein which registers with the central bore 49*a* of the supporting disc 43 and opens at its forward end in the cavity 43*b* in the face of the bridge portion 44 turned toward the motor housing rear end wall 33. A setbolt 46 having a larger diameter bolt head 45, which rests in the cavity 43*b* extends through the central bores 44*a* and 49*a* and protrudes from the rearward face of the supporting disc 49 where it is fastened by means of a washer 47 and cotter pin 48, thus serving as a shaft about which the pins-supporting disc 49 can be rotated by turning the switch cap 40.

The pins-supporting disc 49 has a further axial bore 56 which opens out of the inward face of the disc 49 where the latter abuts against the rearward face 44*b* of the raised bridge portion 44. A resting ball 57 is lodged in the bore 56 and is urged into contact with the rearward bridge portion face 44*b* by means of a pressure spring 58 also lodged in the bore 56 and being supported at its other end on the underside of the washer 47.

Owing to the above-described arrangement, the switch cap 40 is held rotatably at the rear end of the motor unit 11, with the cap side wall 40*a* enclosing the rearward portion of the motor housing 30. Rotation of the cap 40 about the cap shaft 46 is limited by the stop 67 mounted on the forward face of the pins-supporting disc 49 which abuts, in the position shown in FIGS. 4 and 6 against a first counter stop 68, in which position pins 41 and 42 are electrically conductive contact, respectively, with two contactor blades 50 and 51 which are mounted, adjustably in axial direction, in blade bearing means 52 and 53, respectively, which are of electrically insulating material. The contactor blades 50 and 51 are in turn electrically conductively connected via litzes (leads) 50*a* and 51*a* with the commutator brushes 54 and 55, respectively. These brushes 54 and 55 are held in brush holders 38 and 39 of electrically insulating material and slide over the collector segments 24 of the electro motor.

Direct electric current is supplied to the motor 12 from leads 121 and 122 which have their one ends connected to the +pole and −pole, respectively, of a direct electric current source, in particular an automobile battery of 12 volts (FIG. 43), while their other ends are fastened, respectively, to the threaded rearward ends of the contactor pins 41 and 42 by means of fastening nuts 69 and 69*a*.

In the position of the switch cap 40 illustrated in FIGS. 4 and 6 of the collector segments 24 thus receive direct electric current from lead 121 via contactor pin 41, contactor blade 50 and collector brush 54, on the one hand, and from lead 122 via contactor pin 42, contactor blade 51 and collector brush 55, while upon turning the switch cap by 90° counterclockwise (when looking at the rear end 33 of the motor housing 30 in axial direction), i.e., in the sense indicated by the arrow CC in FIG. 6. When the switch cap 40 has been turned through an angle of 90°, the bore 56 of the supporting disc 49 registers with a small recess or indentation 59 in the rearward bridge portion face 44*b*, which recess is large enough to receive half of the ball 57 therein, thus providing a light arresting position for the switch cap 40, indicating that the switch is in OFF-position.

By further rotating the switch cap 40 counterclockwise, the ball 57 is forced out of the recess 59 against the bias of spring 58 until the stop 67 on the disc 49 abuts against a second counter stop 68*a* thus assuming the position indicated by 67' in FIG. 6.

This position of the switch cap 40, the position of the contactor pins 41 and 42 is exchanged, pin 41 now making contact with the contactor blade 51, while the pin 42 makes contact with the contactor blade 50. The motor thus receives direct electric current flowing in the opposite direction from the leads 121 and 122 connected to the automobile battery and will accordingly rotate in the opposite sense.

This means that, if the motor turned clockwise, when the contactor pins and blades made contact in the first described manner, then, with contact established in the last described manner, the motor of unit 11 will be reversed, i.e., it will rotate counterclockwise.

The embodiment of an impact wrench apparatus shown in FIGS. 1 to 6 can be easily converted to a hobby tool. This conversion is possible in two ways. According to one mode of conversion, a connecting bolt 91 can be inserted through a transverse bore 92 in the rib 86 of the impact disc 85, which bolt 91 will protrude into a corresponding bore 93 in at least one of the noses 87 and 88, thus eliminating the impact effect and causing the impact disc 85 to rotate in unison with the clutch halves 79 and 80.

Figure 7:
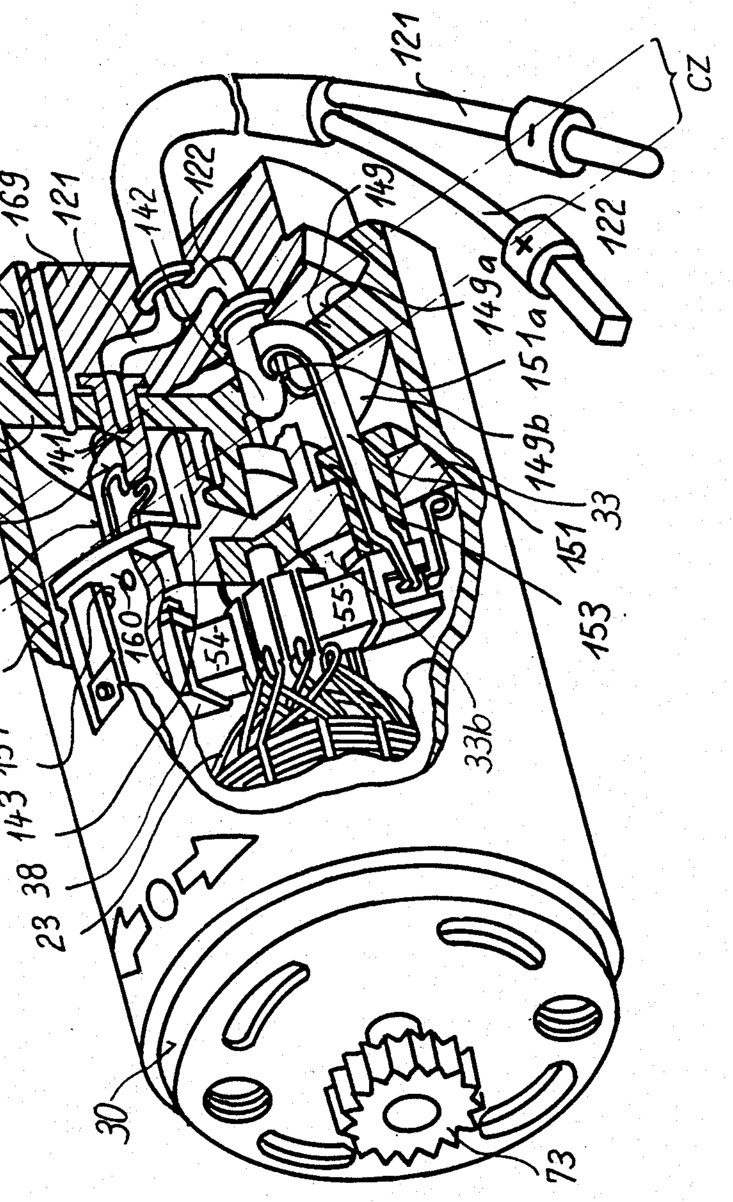
FIG. 7 is a partially cut-open perspective view of the motor unit constituting the second building block, with a second embodiment of switch means described in my U.S. Pat. No. 4,619,162.
Figure 8:
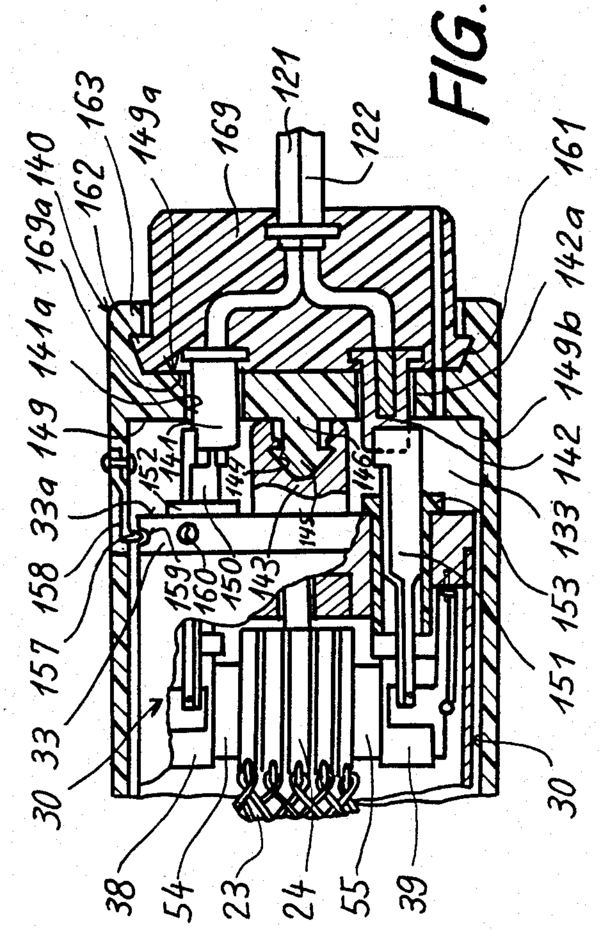
FIG. 8 is a partially axially sectional view of the rear portion of the embodiment of the motor unit and switch means shown in FIG. 7.
Figure 9:
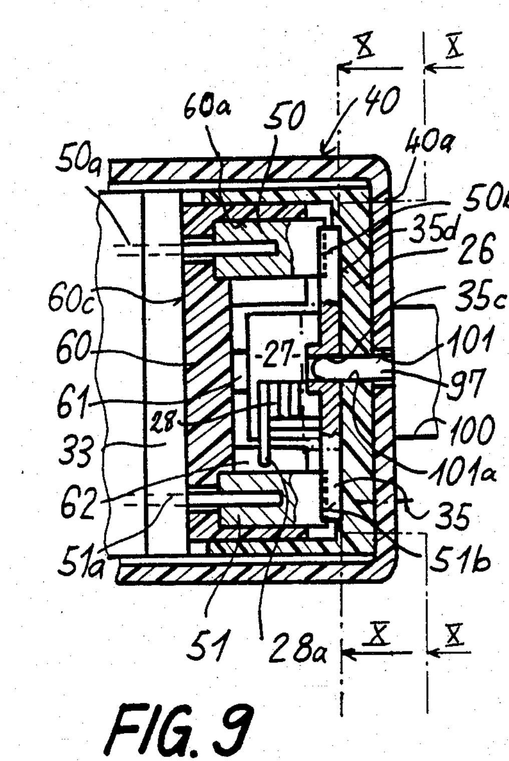
FIG. 9 is an axially sectional view of a first embodiment of the switch means according to the invention, taken in a plane indicated by IX—IX in FIG. 10, infra; with the parts in neutral circuit-breaking position.
Figure 11:
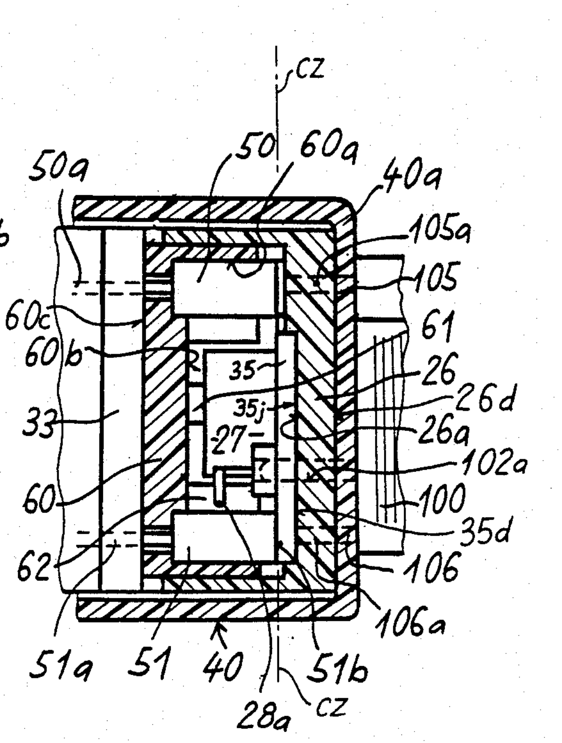
FIG. 11 is a view similar to that of FIG. 9, but with the parts in an activating position.
Figure 10:
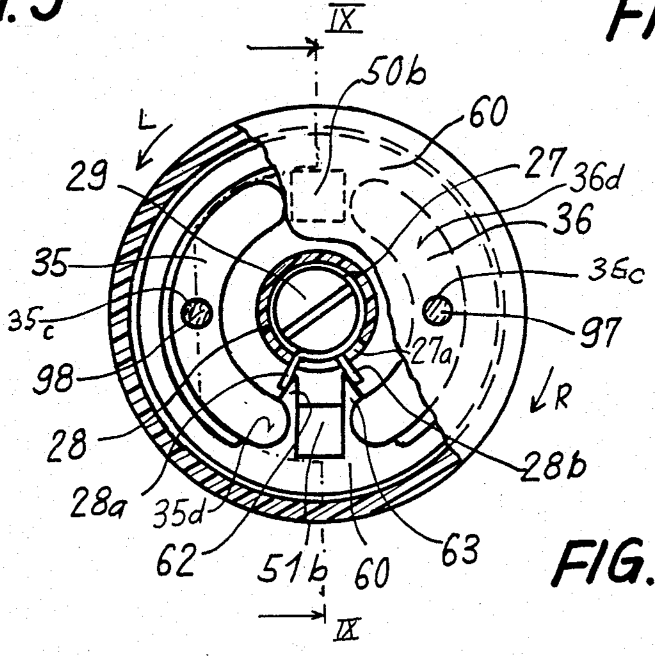
FIG. 10 is a rearward end view, partially cut open, of the embodiment of the novel switch means shown in FIG. 1.

In the embodiment of the motor and the on-off and the reversing switch means described in my U.S. Pat. No. 4,619,162 which are shown in FIGS. 7 and 8 herein, like parts having identical functions are designated by like numerals as in the preceding Figures.

This embodiment is characterized by a particularly simple, sturdy arrangement of the current-conducting parts of the rear portion of the armature and of the switch means. The cap member 140 has a closing wall 149 extending radially with regard to the rotor axis, a lateral cylindrical wall 140*a* and, on the outer face 149*a* of the closing wall 149, a peripheral, inwardly crimped rim 163 surrounding a cavity 161 the bottom of which is constituted by the outer face 149*a* of the closing wall 149 and which cavity 161 is open toward the outside at the rear end of the power tool apparatus.

The closing wall 149 bears on its inner face 149*b* a central pin 146 having a larger diameter head 145 which is snapped into a corresponding snap-in recess 144 in a socket 143, whereby the cap member 140 is supported for pivotal displacement on the rear end wall 33 of the motor housing 30. The socket 143 protrudes axially from the rearward face 33*a* of the motor housing end wall 33. In the rear end wall 33 there are mounted, in diametrical arrangement with regard to the rotor axis, and in blade bearing sleeves 152 and 153, two contactor blades 150 and 151 which extend into the interior of the motor housing 30 and are electrically conductively connected to the brushes 54 and 55, respectively.

In this embodiment, the use of litzes 50*a* and 51*a* has thus been eliminated, thereby reducing the possibility of power losses. At their free ends the contactor blades 150 and 151 bear resilient, inwardly crimped contact spring parts 150*a* and 151*a* which are contacted by contactor pins 141 and 142 which are snugly lodged in corresponding bores or ducts 141*a* and 142*a*, respectively, in the closing wall 149 of the cap member 140 and protrude through this closing wall 149 axially into the interspace 133 between the inner face 149*b* of the closing cap wall 149 and the rearward face 33*a* of the rearward wall 33. The contactor pins 141 and 142 are firmly embedded in a plug body 169 and protrude from the inner face 169*a* thereof, while leads 121 and 122, which are connectable to the minus and plus terminals of an automobile battery, have their opposite ends likewise embedded in the plug body 169 and have their insulation-free cable ends firmly inserted in the contactor pins 141 and 142 respectively. The plug body 169 is inserted firmly into the cavity 161 and abuts with its frontal face 169*a* against the outer face 149*a* of the closing cap wall 149. The plug body 169 is held firmly in the cavity 161 by means of a laterally projecting annular flange part 162 about the frontal face 169*a* of the plug body 169, which flange 162 is snapped-in and held in position by the inwardly projecting annular rim 163 of the cap member 140.

In the periphery of the motor housing rear end wall 33 there is provided a flat indentation 159 which is engaged by a spring tip 157 being mounted at the free end of a small blade spring 158 which urges the tip 157 into engagement with the indentation 159.

This engagement of the spring tip 157 of the indentation 159 is shown in FIGS. 7 and 8. In this position of all parts of the motor housing rear end wall and switch means relative to each other, the motor will run in a determined sense of rotation, when the leads 121 and 122 are plugged into the minus and plus pole, respectively, of the automobile battery. Current will then flow from the lead 121 through the contactor pin 141, the contactor blade 151 and the brush 54 to the collector segments 24 and the windings 23 of the armature 20.

When the cap member 140 together with the plug body 169 therein and together with the contactor pins 141 and 142 is pivoted about the axis of its central pivot 146 in the socket 143, the spring tip 157 leaves the indentation 159 and rotation of the cap member 140 is continued until the spring tip 157 enters a next following indentation 160. This may be noticed by a click audible to the user. In this position, both contactor pins 141 and 142 have broken contact with contactor blades 150 and 151, and no current will flow from the automobile battery to the motor.

Upon further pivoting of the cap member 140 about the axis of its central pin 146 in the same sense of rotation, the spring tip 157 will slide on the peripheral surface of the motor housing rear end wall 33 until it enters, preferably with a click into a third indentation (not shown) in which the contactor pin 141 makes contact with a contactor blade 151, while the contactor pin 142 makes contact with the contactor blade 150. Thereby, current will flow from the negative pole of the automobile battery to the brush 55 and from this brush into the windings 23 of the armature 20 and from the brush 54 back to the plus pole of the battery wire lead 122 and the motor will run in the reverse sense of rotation.

A first, preferred embodiment of the switch means according to the invention is illustrated schematically in FIGS. 9 to 13.

On the rear end wall 33 of the motor housing there is mounted rigidly by conventional fastening means (not shown) a stationary mounting or switch base member 60, of electrically insulating material, which is cup-shaped having a switch interior or cavity 60*a* from the center of the inner or bottom face 60*b* relative to the switch interior, of which there projects axially a stem 61. Stationary contactors 50 and 51 are mounted in the base member 60 and are connected by litzes 50*a* and 51*a*, protruding from the outer face 60*c* of the base member 60 with the motor brushes in the same manner as in the preceding switch embodiments.

A supporting member 26 which bears the shiftable contactor elements 35 and 36 is pivotally mounted on the stem 61 of which latter projects into a dome part 27 of the supporting member 26 by way of a central dome opening. A screw 29 is inserted into a threaded axial bore of the stem 61 and holds a biasing spring 64 in place on the stem. This spring 64 urges the supporting member 26 toward the base member 60.

Preferably, the entire supporting member 26 or at least its annular inside face 26*a* is of electrically insulating material. On this inside face 26*a*, there are mounted the two shiftable contactor elements 35 and 36, each of which is of curved configuration, covering an arc of about 120 degrees about a central switch axis CS which is normal to the base member 60 and the supporting member 26.

A cap member 40 covers the entire switch and has a cap end wall 40*a* on which the supporting member 26 is mounted fixedly. Turning the cap member 40 by hand will therefore also turn the supporting member 26 relative to the base member 60 about the pivot constituted by the stem 61.

Such pivoting of the cap member 40 and the supporting member 26 therein about a small angle of a few, e.g., 15 to 45 degrees to the left (arrow L) will cause a contact face 35*a* at the one end of the contactor member 35 to slide on to the frontal face 51*b* of the fixed contactor 51, while the diagonally opposite contact face 36*a* will slide on to the frontal face 50*b* of the fixed contactor 50. The biasing spring 28 pulls the two faces 35*a* and 36*a* against the faces 51*b* and 50*b*, respectively, thereby causing a secure electrical circuit to be made from a source of direct electrical current via the plug 100 whose prongs 97 and 98 are inserted into throughholes 101 and 102 in the cap member 40 and throughholes 101*a* and 102*a* in the supporting member 26 which throughholes register respectively with one another. The prongs 97 and 98 make electrical contact with the corresponding cavities or bores 35*c* and 36*c* in the central regions of arc-shaped contactor elements 35 and 36.

In order to facilitate the sliding of the ends of contact elements 35 and 36 on to the contact faces 50*b* and 51*b*, respectively, one or both of the contact faces of the shiftable and fixed contactors can be slanted or have beveled or curbed edges, as indicated in FIG. 14.

When the cap member 40 and supporting member 26 are pivoted together to the right (arrow R in FIGS. 10 and 12), the contactor elements 35 and 36 will slide with their diagonally opposite ends 35*b* and 36*b*, respectively, on to the contact faces 50*b* and 51*b*, and the motor of the motor unit 11 will run in the opposite sense of rotation.

After contact has been made by the switch means 12 in the above-described manner and the operator ceases turning the cap member 40, a restoring spring 28 which is housed in the dome part 27 (FIGS. 9 and 10), whose legs 28*a* and 28*b* project from an arcuate slot 27*a* in the sidewall of the dome part 27 and abut against stops 62 and 63 which are integral with the base member 60, will come into action. When the cap member 40 is pivoted to the left, the spring leg 28*a* of the restoring coil spring 28 is held in place by the stop 62 and the spring 28 is tensioned. When turning force exerted on the cap member 40 ceases, the restoring spring 28 will pull the cap member 40 back from the activating position shown in FIG. 12 to the neutral position shown in FIG. 10.

The above-described biasing and restoring spring means can also be replaced by other, less expensive means. Thus, in FIG. 14, the biasing of the supporting member 26 toward the base member 65 is achieved by a plate spring 104 which is lodged in an inner cavity 66*a*, opening toward the motor housing end wall 33, of the base member 65, and is fastened at its center to the free end of a stem 99 of hexagonal, elongated cross sectional area. This stem 99 projects from the center of the supporting member 26 and extends through a recess 66*b* in the face of the base member 65, which is turned toward the supporting member 26, and through a central throughhole 66 in a separating wall part 65*a* of the base member 65, which wall part 65*a* separates the cavity 66*a* from the recess 66*b*.

The hexagonal column representing the stem 99 comprises two opposite broad flanks, and adjoining the two long edges of each of these broad flanks are two pairs of narrow flanks of which each pair has a common edge. The distance between the two broad flanks is considerably shorter than the distance between diagonally opposite narrow flanks. Two elastically resilient blades 107 and 108, made for instance from pieces of flat clockspring steel, lie flat and straight against the two broad flanks of the stem 99. When the cap member 40 and together therewith the supporting member 26 and the stem 99 thereon are turned by an angle of, for instance, 30°, as shown in FIG. 16, the blades 107 and 108 are spread apart and when turning force is no longer applied the cap member 40, the steel blades 107 and 108 will restore the stem 99 and the other parts connected therewith to the neutral position shown in FIG. 15.

In the embodiment of restoring means shown in FIGS. 17 to 19, the restoring elastically resilient element is an elongated plate member 199 which is integral with the supporting member 26. The plate member 199 is mounted at the longitudinal edges 201*a*, 202*a* of two elastically deformable portions 201 and 202 thereof in a rigid cage 103 which is in turn mounted stationary on the face 60*b*, turned toward the supporting member 26, of a base member 60.

Turning of the cap member 40 into an activating position will cause a deformation of the plate member 199, as shown in FIG. 19, generating restoring bias therein while release of the cap member will cause the plate member 199 to straighten out and to return the entire assembly of the shiftable contactor elements 35 and 36, the supporting member 26 and the cap member 40, to the neutral circuit-breaking position shown in FIG. 18.

Figure 13:
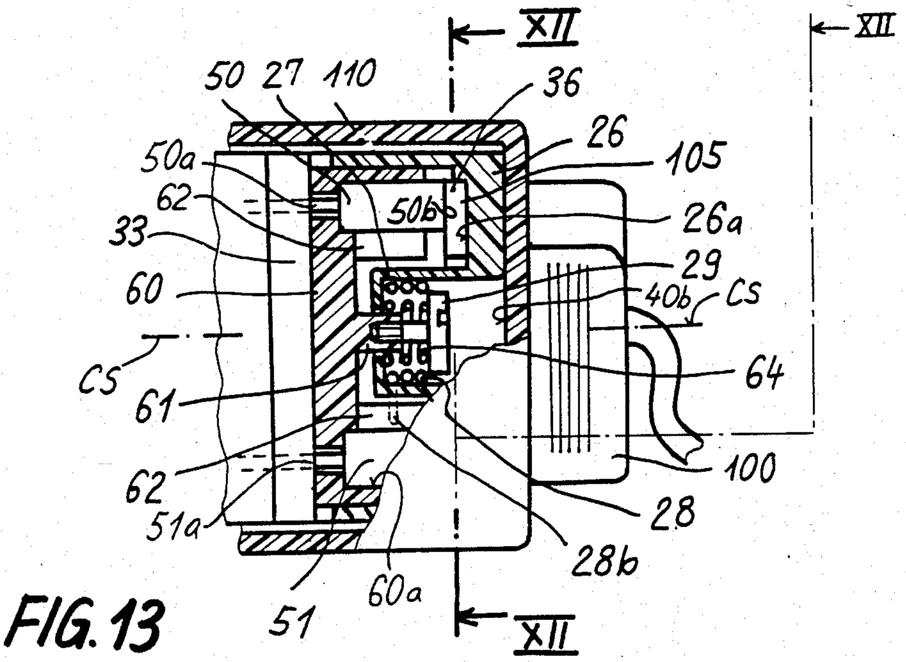
FIG. 13 is a view similar to that of FIG. 11, showing, in axial section, a first embodiment of biasing means in the same embodiment of the switch means as shown in FIGS. 9 to 11.
Figure 12:
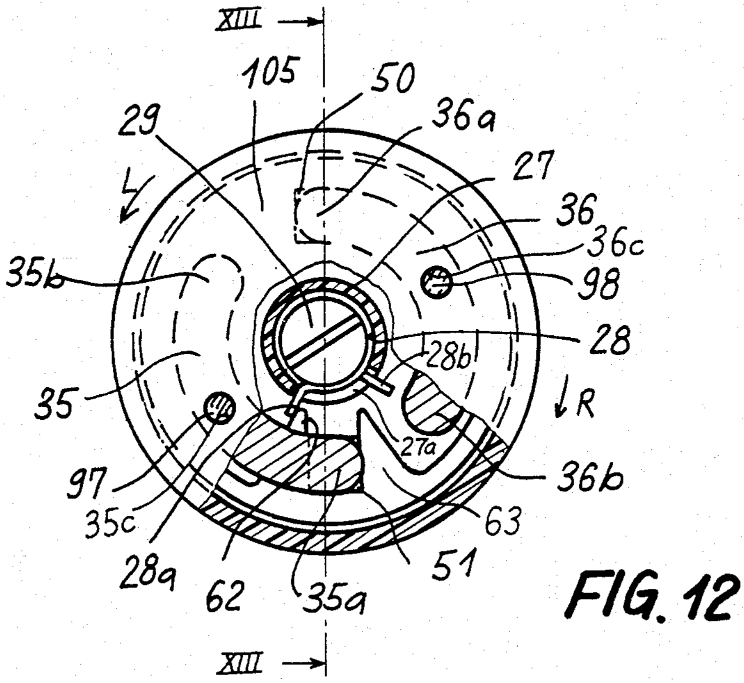
FIG. 12 is a view similar to FIG. 10, but with the parts in an activating position.

Instead of activating the switch means by having the supporting member 26 mounted fast in the cap member 40 for rotation therewith, a cap member 110 can also be connected rigidly with the rearward wall 6 of the first building block, and the supporting member 26 can be loosely surrounded by the cap member 110 and be mounted pivotably on the protruding base member sleeve (61) as shown in FIG. 13.

Figure 21:
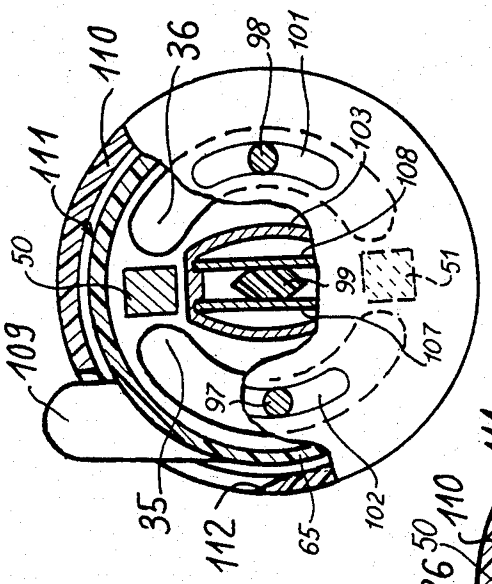
FIG. 21 is a cross sectional view, taken in a plane indicated by XXI—XXI in FIG. 20, with the parts in neutral position.

In this case turning of the supporting member 26 and activation of the electrical circuit is effected with the aid of a push button lever 109 which protrudes tangentially from a window 112 in the stationary cap member 110 and is integral with the rim 111 of the supporting member 26 (see also FIG. 21). The lever 109 protrudes through a window 112 in the stationary cap member 110. This push-button equipped embodiment of the switch means according to the invention is shown in FIGS. 20 to 23.

Figure 22:
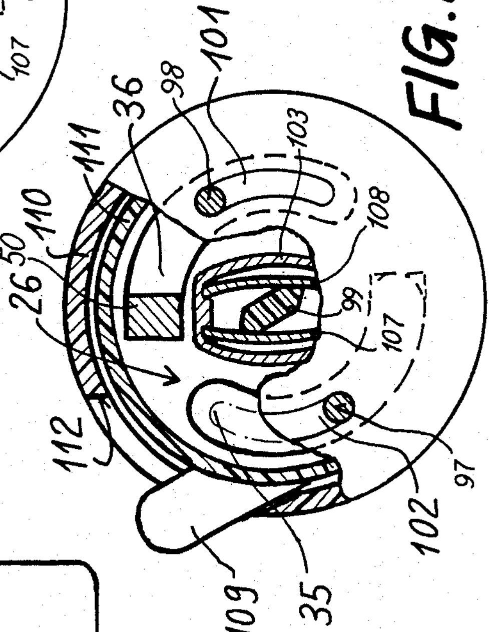
FIG. 22 is a view similar to that of FIG. 21, but with the parts in an activating position.
Figure 20:
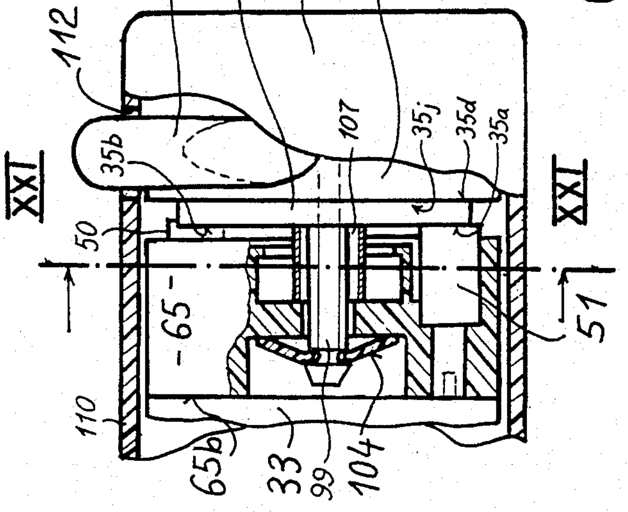
FIG. 20 is an axial-sectional view of a fourth embodiment of the switch means according to the invention.
Figure 23:
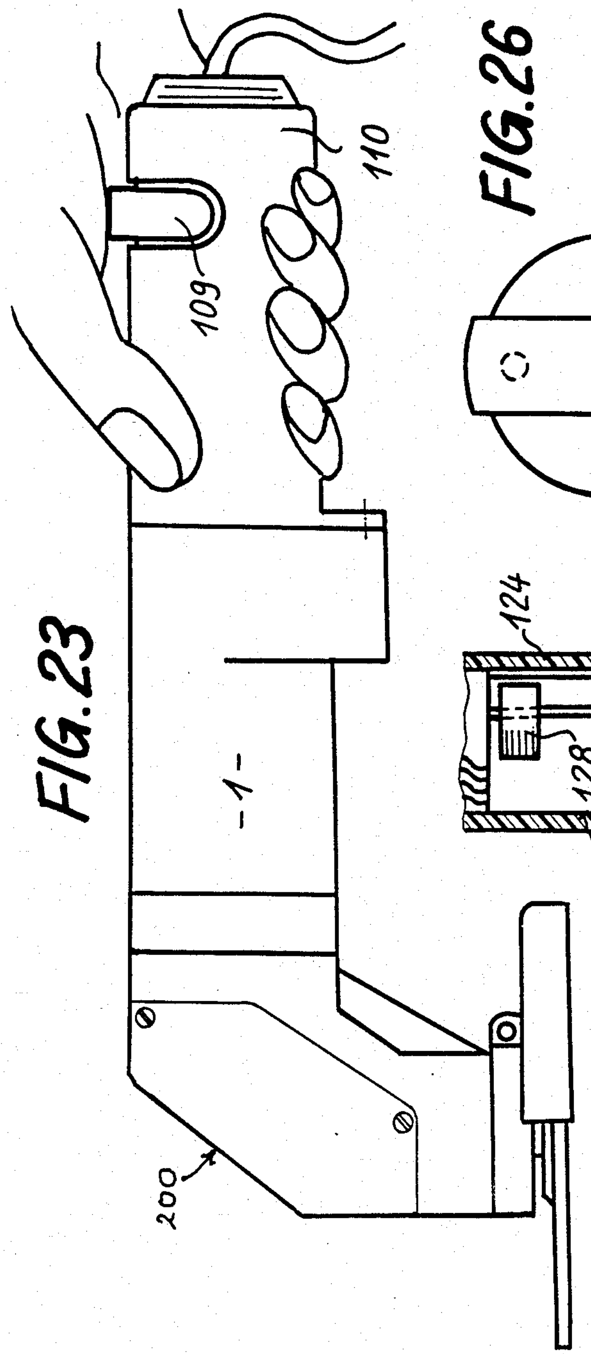
FIG. 23 is a lateral view of an embodiment of a power tool apparatus according to the invention held by an operator's hand activating an embodiment of the switch means as shown in FIGS. 20 to 22.
Figure 26:
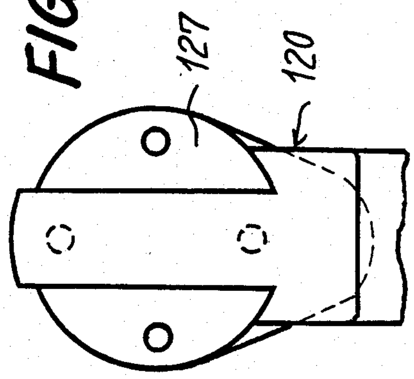
FIG. 26 is a rear end view of the upper rearward part of the handle unit shown in FIG. 24.

FIGS. 20 and 21 thereof show the switch means in neutral position, FIG. 22 shows the push-button lever 109 in downwardly swivelled position, whereby the supporting member has been turned by an angle of about 30°, and FIG. 23 shows how the operator can depress the lever 109 with the palm of his hand while holding the power tool apparatus according to the invention.

Figure 24:
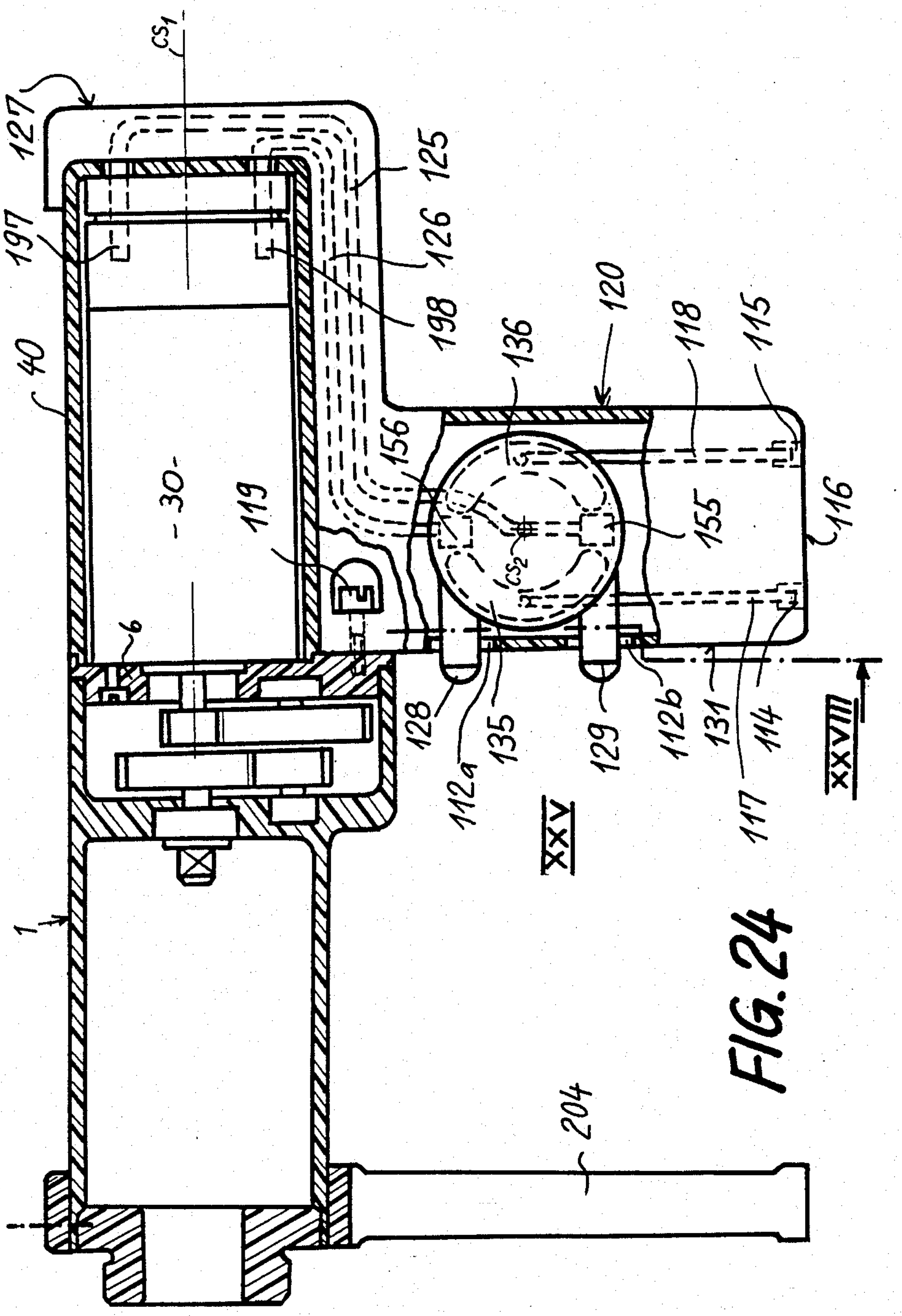
FIG. 24 shows in axial-sectional view the same embodiment of the power tool apparatus shown in FIG. 1, but without inserted shaft means of the third insert unit (8C) in said building block, and, attached to the first building block, a first embodiment of a handle unit according to the invention.

In a kit, there can be provided, as an auxiliary item, a handle part, a preferred embodiment of which is designated by the reference number 120 in FIG. 24.

This handle part 120 can be fastened rigidly, e.g., by screw bolts 119, on the outside of the rear end wall 6 of the first building block. A grip member 204 can also be clamped on to the shell 1.

Figure 25:
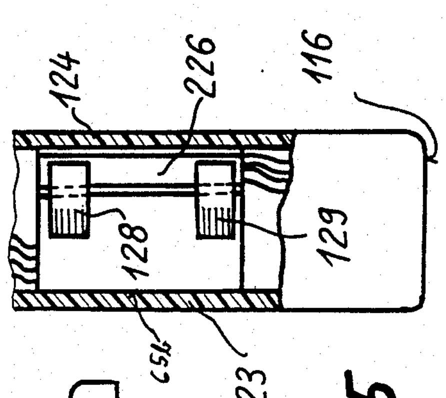
FIG. 25 is a partial cross sectional view of the handle unit taken in a plane indicated by XXV—XXV in FIG. 24.

Between opposite sidewalls 123 and 124 (FIG. 25) there is mounted a switch of the type illustrated in FIGS. 20 to 21. However, the base member 65 is mounted, with its outer face 65*b*, not on the outside face of the motor housing end wall 33, but instead on the inner surface of the sidewall 123, and the supporting member 226 is pivotally mounted on the base member 65 in the same manner as illustrated in the case of supporting member 26 n FIG. 14, with the outer face of the supporting member 226 extending parallel with, but slightly spaced from the inner surface of the opposite sidewall 124 of the handle part 120.

The prongs 97 and 98 of the plug 100 can be inserted in corresponding sockets 114 and 115 at the downward end 116 of the handle part 120 which sockets are connected via leads 117 and 118 with the shiftable connector elements 135 and 136.

The fixed contactors 155 and 156 are connected by means of electrical leads 125 and 126 which extend up to a rear extension 127 of the handle part 120 to surround the rearward end of the cap member 40 and bear at their other ends prongs 197 and 198. These prongs are inserted into the throughholes 105, 105*a* and 106, 106*a* in the cap member 40 and the supporting member 26, respectively, (FIG. 14) and are long enough to make firm contact with the frontal contact faces 50*b* and 51*b* of the stationary contactors 50 and 51, thereby holding the cap member 40 and the supporting member 26 stationary relative to the stationary base member 65.

The supporting member 226 bears tangentially disposed actuating levers 128 and 129 which protrude from the interior of the handle part 120 through windows 112*a* and 112*b* in a front wall 131 of the handle part 120.

Depression of one of the actuating levers energizes the motor in the housing 30 in one sense of rotation, depression of the other lever energizes the motor for rotation in the opposite sense.

I claim:

1. Electric direct current switch means having a central switch axis and a substantially planar contact zone extending normal to aid switch axis, said switch means comprising:

(1) stationary base means having an inner mounting face and an opposite outer face;

(2) first and second fixed contactor means mounted firmly in said base means and having, at outer ends thereof, each a terminal portion bearing a contactable surface region, while projecting from said inner mounting face and extending substantially in said contact plane; and lead means connected to inner ends of said contactor means and extending through said base means and out of said outer face thereof;

(3) a pivotable supporting member having at least one electrically insulating face turned toward said inner mounting face of said base means and an opposite outer face, each insulating face being spaced from and registering with a corresponding one of said contactable surface regions of said fixed contactor means; said pivotable supporting member having a peripheral rim thereabout extending radially spaced about said central switch axis;

(4) socket throughholes extending through said pivotable supporting member and each having orifices, respectively, in said opposite outer face thereof and in a correspondingly electrically insulating face thereof, said socket throughholes being adapted for receiving each a prong of an electric plug insertable therein from said opposite outer face of said pivotable supporting member, said plug being connectable to lead means from a source of electric direct current;

(5) at least two shiftable elongated and rigid contactor elements having each a contact-making section facing toward said base means, an opposite external face and a joining portion, taken in a zone perpendicular to said central switch axis, said joining portion being affixed to said pivotable supporting member in fixed engagement therewith and insulatedly spaced from one another and each located in such relation to a socket throughhole of said supporting member as to make contact between the respective contactor element and a prong inserted in the respective throughhole, and each of said contact making sections protrudes from a corresponding one of said electrically insulating faces of said pivotable supporting member;

(6) engaging means for pivotably mounting said pivotable supporting member on said stationary base means, comprising a first engaging member mounted fixedly on said inner mounting face of said base member so as to project therefrom toward said pivotable supporting member, and a second engaging member mounted fixedly on said pivotable supporting member for pivoting motion in unison therewith, and projecting therefrom toward said base means, one of said first and second engaging members having a male projection adapted for penetrating engagingly into an adjacent corresponding female portion of said other engaging members; and further comprising means for exerting forces on said first and second engaging members for urging them into engagement with one another alone said central switch axis;

(7) manual actuating means for tangentially acting on said peripheral rim of said pivotable supporting member for pivoting the same to at least one of the three positions of:

(a) an "off" position in which aid shiftable contact elements are in circuit-breaking position with regard to said fixed contactor means, (b) a first "on" position in which a first shiftable contact element is in circuit-making contact with a corresponding first fixed contactor means and a second shiftable contact element is in circuit-making contact with a corresponding second fixed contactor means, thereby enabling direct current flow through said switch means in a given direction, and (c) a second "on" position in which said first and second shiftable contact elements are in circuit-making contact, respectively, with said second and said first fixed contactor means, thereby enabling direct current flow through said switch means in the reverse direction, and said actuating means being positively connected with said pivotable supporting member for rotation in unison therewith; and (8) contact pressure-enhancing means intermediate said inner mounting face of said stationary mounting base means and said insulating face of said pivotable supporting member for urging the contact-making section of each of said shiftable contactor elements against a corresponding contactable surface region of said fixed contactor means, while said contactor elements and fixed contactor means are in an activated ("on") position.

2. The electrical switch means of claim 1, wherein each of said shiftable contactor elements is curved, having a cross-sectional area, of arc-shaped configuration, taken in a plane normal to said central switch axis; and wherein said contactable surface region on each of said terminal portions of said first and second fixed contactor means constitutes the frontal face of the respective terminal portion and extends in said contact zone in a plane substantially normal to said central switch axis, thereby being adapted for circuit-making with a correspondingly shiftable contactor element, and said means for exerting forces defined under (6) serve simultaneously as said contact pressure-enhancing means defined under (8).

3. The electrical switch means of claim 2, wherein said arc formed by each shiftable contactor element in said cross-sectional area plane extends through a major portion of a half circle about said switch axis, and said first and second shiftable contactor elements each rest with their outer faces firmly on said pivotable supporting member over the entire lengths of said arcs, a first one of said shiftable contactor elements being lodged in said electrically insulating face of said supporting member spaced from and curved about said central switch axis and second one of said contactor elements is lodged in said insulating face mirror symmetrically to said first contactor element.

4. The electrical switch means of claim 3, wherein said arc-shaped contactor elements have at least one end thereof beveled to form a ramp facilitating sliding of the contact face thereon on to the respective contactable surface region of the nearest terminal fixed contactor portion.

5. The electrical switch means of claim 1, wherein:

(a) said pair of shiftable contactor means are pin-shaped, each having a lateral contact region and being mounted in said pivotable supporting member and extending substantially axially relative to said central switch axis from outside said outer face of said supporting member and through said cap member and protruding from said inner face of said pivotable supporting member toward said stationary mounting means and into said substantially planar contact zone by a distance such as to extend parallel with said stationary contactor terminal portions; and (b) said contactable surface regions of said stationary contactor means are located in the sidewalls of said terminal portions thereof and face radially toward said axially extending lateral contact regions of said shiftable contactor means, said lateral contact regions of said shiftable contactor means being of sufficient length to make contact with said contactable sidewall regions, of said terminal portions, when said supporting member is angularly pivoted relative to said stationary mounting means into either of one of said "on" positions, while breaking contact when in at least one intermediate positions between said two "on" positions.

6. The electrical switch means of claim 5, wherein, of the two regions consisting of said lateral contact region and said contactable sidewall region, a first one comprises inwardly crimped contact spring parts and the other region is pin-shaped so as to be clampingly engageable by the first region.

7. The electrical switch means of claim 5, wherein said actuating means comprise:

a cap member comprising a cap end wall and a hull part upstanding axially therefrom about an inner face of said cap end wall; said inner face of said cap end wall being turned toward said outer face of said pivotable supporting member; said hull extending axially toward the plane normal to said central switch axis in which said outer face of said base means extends;

said cap member has passage means for the introduction of a pair of lead means extending from a source of electric energy into electrically conductive engagement with a pair of said shiftable contactor means.

8. The electrical switch means of claim 1, wherein said actuating means comprise:

a cap member comprising a cap end wall and a hull part upstanding axially therefrom about an inner face of said cap end wall; said inner face of said cap end wall being turned toward said outer face of said pivotable supporting member; said hull extending axially toward the plane normal to said central switch axis in which said outer face of said base means extends;

said cap member has passage means for the introduction of a pair of lead means extending from a source of electric energy into electrically conductive engagement with a pair of said shiftable contactor means.

9. The electrical switch means of claim 3, wherein said male projection of said one engaging means is constituted by a stem protruding centrally axially from said inner mounting face, said stem having at the free end thereof an internally threaded axial cavity, and said female portion of said other engaging means is constituted by a dome part projecting centrally axially from said electrically insulating contactor element face inside the half circles thereon occupied by said shiftable contactor elements, said dome part having a central opening for the entry of said stem thereinto, and said means for exerting forces comprise an adjustable screw means having an enlarged head and a shaft part bearing an external threading for adjustably engaging said internal threading in said stem cavity; and a compressible pressure spring, being mounted about said screw shaft part, and lodged inside said dome part and against said screw head.

10. The electrical switch means of claim 1, further comprising restoring means for returning the shiftable supporting member automatically from an activating "on" position to the neutral "off" position.

11. The electrical switch means of claim 10, wherein said restoring means are constituted by a coil spring having two free ends one of which is in engagement with the pivotable supporting member and the other spring end is held in the stationary base means, whereby this spring applies restoring bias into the neutral position to the pivotable supporting member when the latter is pivoted from neutral position to an activating position.

12. The electrical switch means of claim 9, further comprising restoring means for returning the shiftable supporting member automatically from an activating "on" position to the neutral "off" position, and wherein said restoring means are constituted by a coil spring having two free ends one of which is in engagement with the pivotable supporting member and the other spring end is held in the stationary base means, whereby this spring applies restoring bias into the neutral position to the pivotable supporting member when the latter is pivoted from neutral position to an activating position; said coil spring being lodged inside said dome part, surrounding said pressure spring therein, said dome part having a sidewall and a radial slot in said sidewall and said stationary base means has two stops projecting radially inwardly toward said dome part, one of the free ends of said coil spring abutting against and being arrested by one of said stops when said pivotable supporting member is pivoted into an activating position while the other free coil spring end abuts against an end of said arcuate dome part sidewall slot remote from the arresting stop.

* * * * *